US012462846B2

(12) United States Patent
Rogers et al.

(10) Patent No.: US 12,462,846 B2
(45) Date of Patent: Nov. 4, 2025

(54) UTILIZING PROXY-BASED STREAMING TO PROVIDE AN END-TO-END VIDEO EDITING INTERFACE

(71) Applicant: Dropbox, Inc., San Francisco, CA (US)

(72) Inventors: Alan Rogers, Brunswick (AU); Iris Lin, San Francisco, CA (US); James Espejo, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 20 days.

(21) Appl. No.: 18/585,856

(22) Filed: Feb. 23, 2024

(65) Prior Publication Data
US 2025/0273244 A1    Aug. 28, 2025

(51) Int. Cl.
*G11B 27/031* (2006.01)
*G06F 3/04845* (2022.01)
*G06F 3/04847* (2022.01)

(52) U.S. Cl.
CPC ........ G11B 27/031 (2013.01); G06F 3/04845 (2013.01); G06F 3/04847 (2013.01)

(58) Field of Classification Search
CPC .......... G11B 27/031; G06F 3/04845; G06F 3/04847
See application file for complete search history.

(56) References Cited

U.S. PATENT DOCUMENTS

| | | | |
|---|---|---|---|
| 8,126,313 B2 | 2/2012 | Haot et al. | |
| 8,265,457 B2 | 9/2012 | Baum et al. | |
| 8,515,241 B2 | 8/2013 | Forsyth et al. | |
| 8,522,145 B2 | 8/2013 | Takagi | |
| 8,527,646 B2 | 9/2013 | Khatib et al. | |
| 8,819,185 B2 | 8/2014 | McLaughlin | |
| 9,116,896 B2 | 8/2015 | Fourcher et al. | |
| 11,069,378 B1 | 7/2021 | Turgut et al. | |
| 2007/0136438 A1 | 6/2007 | Brocke et al. | |
| 2020/0195982 A1* | 6/2020 | Streater | H04N 21/2187 |
| 2024/0212715 A1* | 6/2024 | Yee | G06F 40/166 |
| 2025/0111695 A1* | 4/2025 | Li | G06V 40/161 |

FOREIGN PATENT DOCUMENTS

| | | |
|---|---|---|
| CN | 106791933 A | 5/2017 |
| CN | 112291627 A | 1/2021 |
| CN | 114025200 A | 2/2022 |
| JP | 5159481 B2 | 3/2013 |
| WO | 2007082167 A2 | 7/2007 |
| WO | 2007082167 A3 | 4/2008 |
| WO | 2022162400 A1 | 8/2022 |

* cited by examiner

*Primary Examiner* — Thai Q Tran
*Assistant Examiner* — Jose M Mesa
(74) *Attorney, Agent, or Firm* — Keller Preece PLLC

(57) ABSTRACT

The present disclosure is directed toward systems, methods, and non-transitory computer-readable media for providing a streamed presentation of a video proxy referencing a cloud-based location of a digital video. For example, the disclosed systems receive a request to edit a digital video stored in a cloud-based location of a content management system. In addition, the disclosed systems generate a video proxy that include a reference to the cloud-based location of the digital video and modifies the video proxy in response to an editing operation. Further, the disclosed systems provide for display a streamed presentation of the video proxy depicting modifications defined by the editing operation.

20 Claims, 13 Drawing Sheets

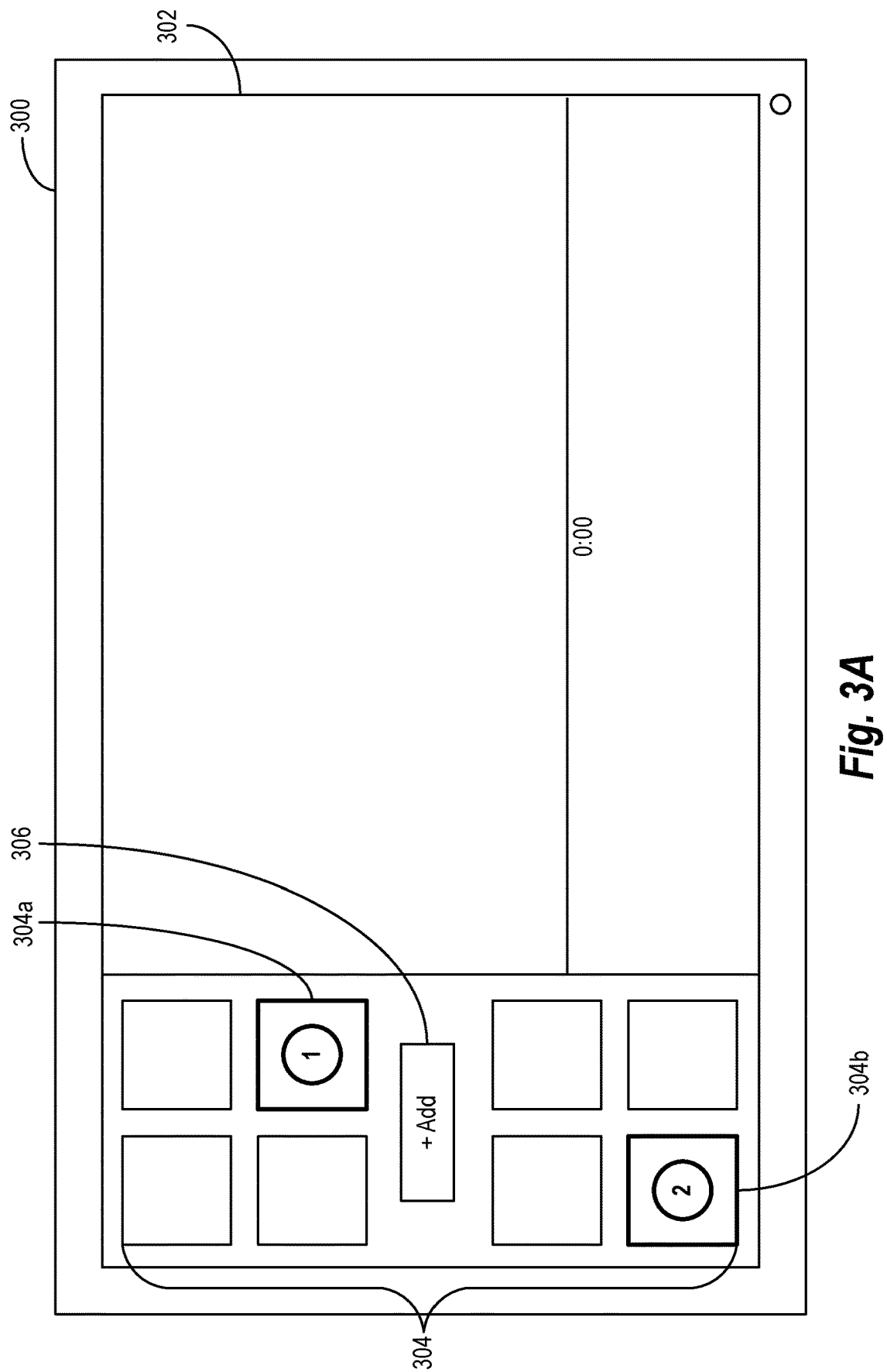

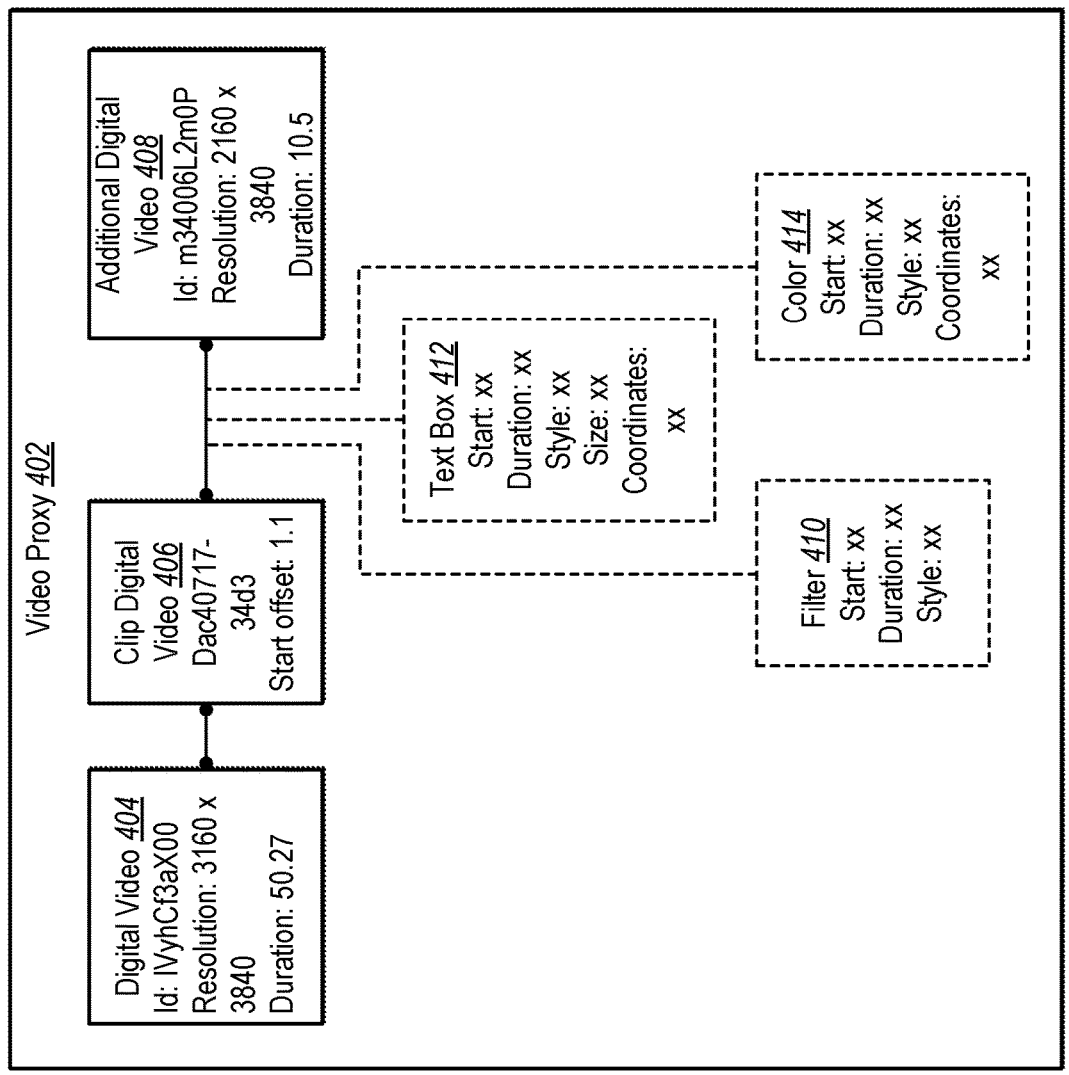
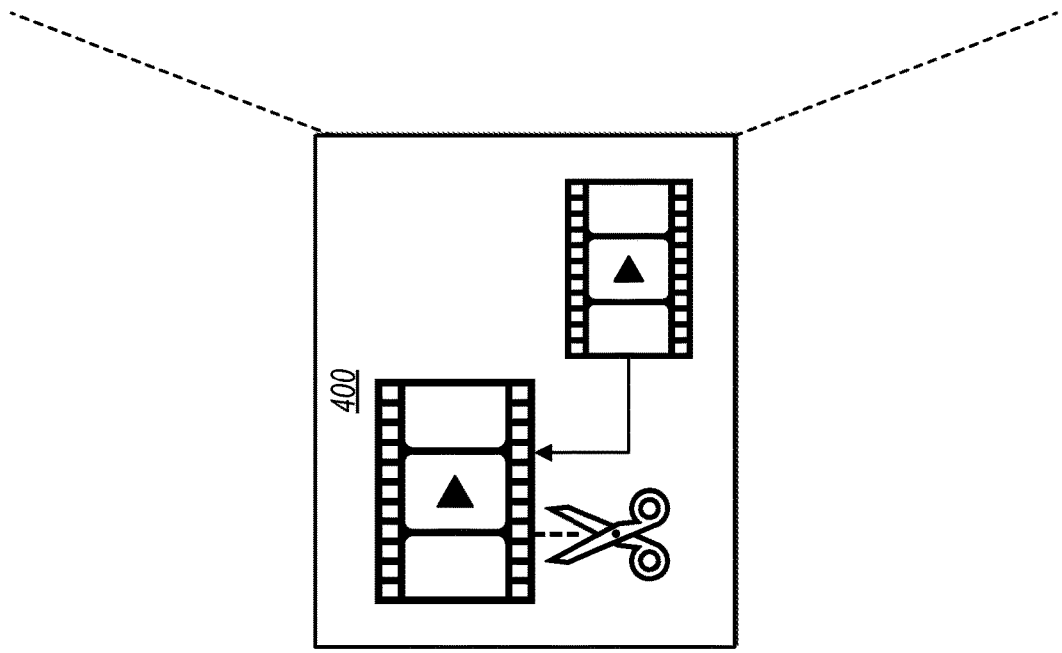
Fig. 4

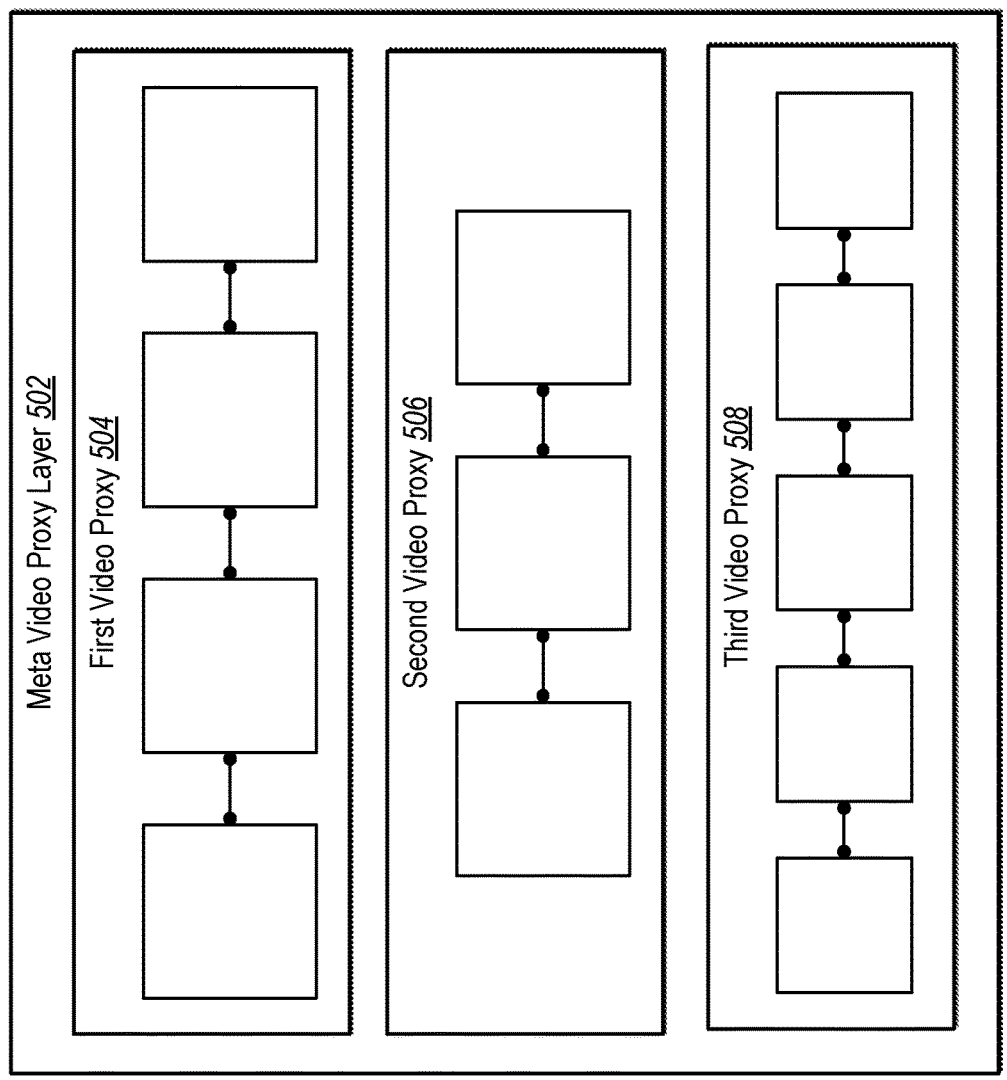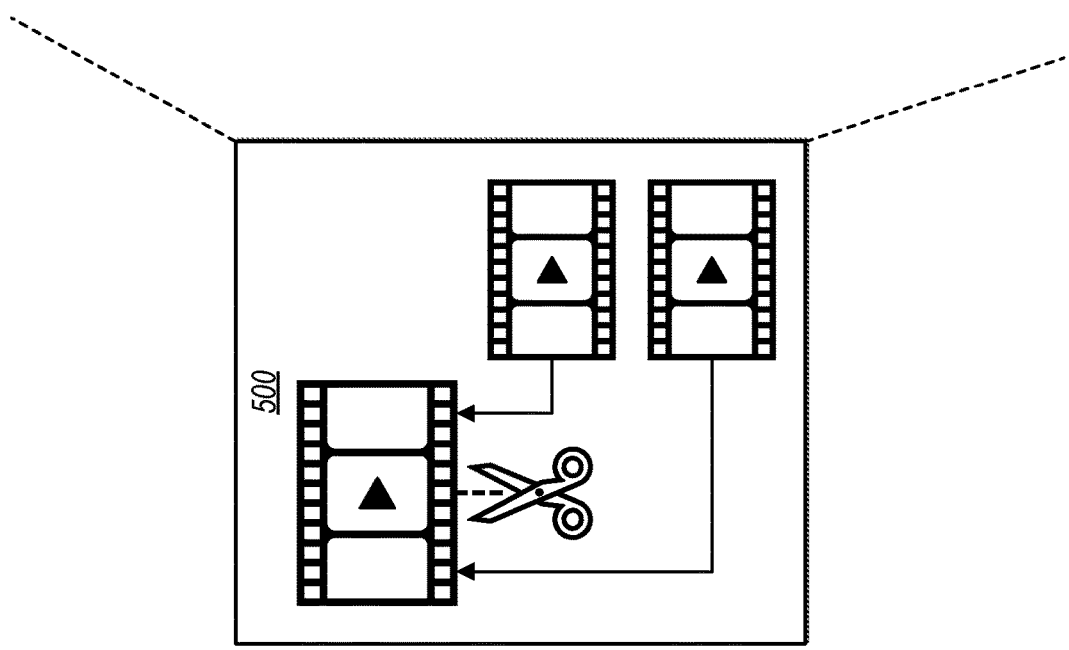
Fig. 5

UTILIZING PROXY-BASED STREAMING TO PROVIDE AN END-TO-END VIDEO EDITING INTERFACE

BACKGROUND

Advancements in computing devices and networking technology have led to a variety of innovations in digital video editing capabilities. Indeed, existing digital video editing systems can process large amounts of video data and render high quality digital video edits. Despite these developments, many existing systems still suffer from a variety of technical deficiencies that result in inefficient use of computer resources, inefficient user interfaces, and inflexible systems that create rigid workflows.

As suggested, many existing digital video editing systems have slow performance, especially at scales of digital video editing that involves multiple high-quality digital videos. Specifically, the setup of existing digital video editing systems typically requires uploading an entire digital video file, performing edits to the digital video file, rendering the edits, and exporting the digital video file. The multiple user interface steps and computer resources (processing, storage, and communication bandwidth) required for uploading, rendering, and exporting (especially for multiple digital video files) consumes a significant amount of computational resources. The large computational consumption results in an inefficient use of processing power, data storage, and communication bandwidth throughout the process of creating edited digital videos.

In addition, existing digital video editing systems also have slow performance for digital video editing that involves multiple collaborator devices (e.g., two or more devices working on the same video editing project). Specifically, as mentioned above, digital video editing involves the uploading, rendering, and exporting of a significant amount of data. Accordingly, existing digital video editing systems that involve multiple collaborating devices results in consuming an excessive number of resources for collaborator devices to collectively perform the needed editing operations as the collaborator devices share video data back and forth throughout the video editing process.

Inefficient use of computer storage is a specific concern in existing video editing systems. Most video editing systems must render edits and create a new video file to be able to share the results of an edited file with other client devices. Accordingly, during an editing collaboration, existing systems create a large number of copies of a video file, e.g., there is a separate video file for each new version of the edited video. Therefore, existing systems inefficiently use computer storage that can result in storage cap issues and performance declination of the system.

Furthermore, existing digital video editing systems typically require excessive user interactions and multiple user interfaces to perform the digital video editing process. Specifically, existing digital video systems require an editor to export a digital video file to share with a collaborator, a collaborator to download the digital video file for providing comments or feedback, and in some instances, the collaborator would need to export the digital video file to share the feedback with the editor. As such, existing digital video editing systems involve multiple interfaces, steps, and interactions to successfully collaborate with additional collaborators.

Additionally, existing digital video editing systems suffer from operational inflexibility. Specifically, video editing and sharing of edited video workflows of existing systems often require a rigid process of uploading, editing, rendering the edits, and then sharing the rendered video file. However, during typical editing sessions among users, many edits will be rejected, changed or updated based on feedback from users. Accordingly, to incorporate any feedback, existing systems again have to perform the same process of uploading, editing, rendering, and exporting, even when the feedback is simply to remove a previously applied edit.

SUMMARY

This disclosure describes one or more embodiments of systems, methods, and non-transitory computer-readable storage media that provide benefits and/or solve one or more of the foregoing and other problems in the art. For instance, the disclosed systems provide an end-to-end digital video editing interface that references cloud-based locations in a content management system to access digital videos, edit digital videos, and collaborate amongst multiple client devices. For example, the disclosed systems receive a request to edit a digital video stored in a cloud-based location and generates a video proxy that includes a reference to a cloud-based location of the digital video. In particular, the disclosed systems modify the video proxy to include computer instructions defining edit parameters of the editing operation (e.g., in response to an editing operation within a video editor). Then, when a client device accesses an edited video, the system applies the instructions in the video proxy while streaming the digital video to the client device. In other words, in some embodiments, the disclosed systems stream the video proxy from a cloud-based location and depict modifications defined by editing operations.

BRIEF DESCRIPTION OF THE DRAWINGS

This disclosure will describe one or more example implementations of the systems and methods with additional specificity and detail by referencing the accompanying figures. The following paragraphs briefly describe those figures, in which:

FIGS. 3A-3B illustrates example graphical user interfaces of an end-to-end video editing interface in accordance with one or more embodiments;

FIG. 4 illustrates an example diagram of the proxy-based streaming edit system generating a video proxy for a video composition in accordance with one or more embodiments;

FIG. 5 illustrates an example diagram of the proxy-based streaming edit system generating a meta video proxy layer in accordance with one or more embodiments;

DETAILED DESCRIPTION

Figure 1:
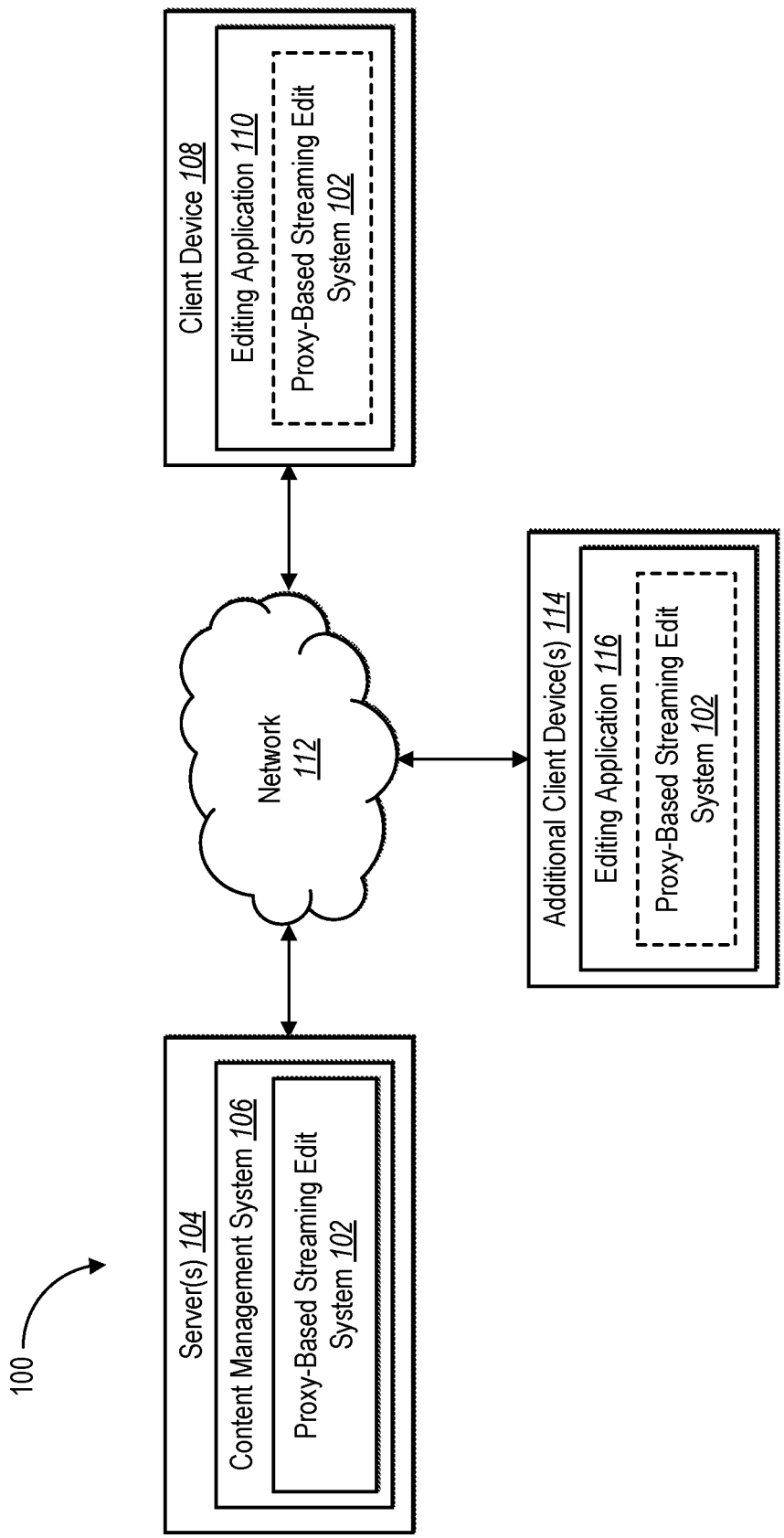
FIG. 1 illustrates a schematic diagram of an example environment of a proxy-based streaming edit system in accordance with one or more embodiments.

This disclosure describes one or more embodiments of a proxy-based streaming edit system for web-based video editing. For example, the proxy-based streaming edit system provides an end-to-end digital video editing interface within a web browser or native application that can apply edits to a digital video (e.g., or multiple digital videos) using a streamed proxy. In other words, the proxy-based streaming edit system streams the digital video from a cloud-based location to allow a client device to indicate edits to a digital video and modifies a corresponding video proxy to include instructions that define the indicated edits. For instance, rather than creating a separate digital video file to edit the digital video, the proxy-based streaming edit system generates a video proxy that references the digital video in a cloud-based location, and the video proxy can further be modified to include instructions that define how a digital video is depicted during streaming. Accordingly, the proxy-based streaming edit system provides an end-to-end digital video editing interface that overcomes the need to upload, render, or export digital video files in the process of applying editing operations to one or more digital videos.

In one or more embodiments, the proxy-based streaming edit system leverages a content management system with already uploaded digital videos (in cloud locations) and streams the digital videos from the cloud-based locations. Specifically, the proxy-based streaming edit system synchronizes with the content management system and applies editing operations to video proxies associated with the digital videos. As such, the proxy-based streaming edit system establishes an ecosystem that allows client devices to perform edits to digital videos stored in the content management system and collaborate with additional client devices without modifying the original digital video files.

As mentioned above, the proxy-based streaming edit system generates a video proxy that references a digital video and further includes computer instructions. Specifically, the video proxy includes an instruction set or a resource list that tracks edits made to one or more digital videos. For example, the video proxy includes timestamps where particular edits are made, x/y coordinates of edits, which types of edits are made, and the addresses or storage locations of the digital videos.

Moreover, the proxy-based streaming edit system generates the video proxy that stores data and instructions for each composition (edits applied to one or more digital videos) created using the end-to-end digital video editing interface, which circumvents the need to generate entirely new files for edited digital videos. Rather, the proxy-based streaming edit system utilizes the video proxy to fetch resources and execute edit instructions to define a video composition of a digital video without any actual video file backing the composition.

In one or more embodiments, the proxy-based streaming edit system allows a client device to share a video composition using a link to the video proxy that enables sending a full version of the video composition without any exporting or downloading. Specifically, in response to a client device clicking the link to the video proxy, the proxy-based streaming edit system causes a graphical user interface to display a digital video presentation interface and streams the composition according to the computer instructions in the video proxy. For example, the client device can leave comments to suggest one or more additional modifications or edits to the video composition.

In one or more embodiments, the proxy-based streaming edit system can receive an indication (e.g., from a client device) to export a video composition (e.g., exporting a finalized composition). Specifically, the proxy-based streaming edit system exports the composition into a cloud-based location of the content management system. In other words, the proxy-based streaming edit system performs the export on the cloud and does not require the client device to continue running while the export is being performed. In one or more embodiments, the proxy-based streaming edit system can publish an exported composition directly to one or more websites. Specifically, the proxy-based streaming edit system performs the export on the cloud and in response to the export being completed, the proxy-based streaming edit system performs the act of publishing the composition to one or more social media websites without the need for additional client device interaction.

As mentioned above, the proxy-based streaming edit system can provide several improvements or advantages over existing digital video editing systems. For example, the proxy-based streaming edit system improves efficiency over conventional systems. Specifically, the proxy-based streaming edit system avoids having to upload, render, export, and download video compositions by generating a video proxy for the video composition (e.g., the digital video) that includes a reference to a cloud-based location. For example, as mentioned above, the proxy-based streaming edit system provides a streamed presentation of the video proxy referencing the cloud-based location of the digital video and depicting modifications defined by the editing operation in the video proxy. Thus, the proxy-based streaming edit system avoids the need to upload/export digital videos by utilizing the video proxy to fetch resources and execute edit instructions to define a composition of a digital video without any actual video file backing the composition. In doing so, the proxy-based streaming edit system speeds up the process of creating compositions and reduces the number of computational resources used to do so.

Additionally, the proxy-based streaming edit system also improves computational efficiency for digital video editing that involves multiple collaborator devices. Specifically, the proxy-based streaming edit system shares a composition with a collaborator device using a link to the video proxy that enables sending a full version of the composition without any exporting or downloading. Thus, digital video editing involving multiple collaborator devices consumes less resources than conventional systems by avoiding the exporting or downloading of video compositions.

In one or more embodiments, the proxy-based streaming edit system improves upon computational storage inefficiencies of conventional systems. Specifically, rather than creating duplicates of digital video files during the digital video editing process, the proxy-based streaming edit system utilizes the video proxy to fetch resources and execute edit instructions to define a composition of a digital video without any actual video file backing the composition. For example, the proxy-based streaming edit system generates a video proxy and modifies the video proxy to include computer instructions defining edit parameters of the editing operations. In doing so, the proxy-based streaming edit system avoids taking up additional storage space in the content management system.

Moreover, conventional systems typically have memory caps for web-based editing interfaces. For instance, some conventional systems cap the size of digital video files to be edited on a web-based editing interface. In some embodiments, because the proxy-based streaming edit system utilizes the video proxy (e.g., obviating the need for uploading, rendering, or exporting), the proxy-based streaming edit system consumes much less than the cap size of digital files while working with video file sizes that far exceed the memory cap.

In one or more embodiments, the proxy-based streaming edit system also reduces excessive user interactions and multiple user interfaces in the digital video editing process. Specifically, the proxy-based streaming edit system provides the end-to-end video editing interface that streamlines the editing and collaborating into an interface for editing and an interface for collaborating. For example, the proxy-based streaming edit system avoids the need to iteratively upload, export, and download digital videos to collaborate with additional collaborating devices. Thus, the proxy-based streaming edit system reduces the number of interfaces and interactions needed in the video editing process, especially with respect to collaboration editing projects.

In one or more embodiments, the proxy-based streaming edit system also improves upon operational flexibility. Specifically, due to the video proxies, the proxy-based streaming edit system is not constrained by the amount and size of digital video files utilized in a video composition. In addition, the proxy-based streaming edit system improves the capabilities of the digital video editing process by not limiting digital video editing to the processing power and network speed of an individual client device.

Additional detail regarding the proxy-based streaming edit system will now be provided with reference to the figures. For example, FIG. 1 illustrates a schematic diagram of an example system environment for implementing a proxy-based streaming edit system 102 in accordance with one or more implementations. An overview of the proxy-based streaming edit system 102 is described in relation to FIG. 1. Thereafter, a more detailed description of the components and processes of the proxy-based streaming edit system 102 is provided in relation to the subsequent figures.

FIG. 1 illustrates an environment 100 that includes server(s) 104 for executing or performing operations for the proxy-based streaming edit system 102. Within the environment 100, FIG. 1 further shows a content management system 106, a client device 108, an editing application 110, a network 112, and additional client device(s) 114. Each of the components of the environment 100 can communicate via the network 112, and the network 112 may be any suitable network over which computing devices can communicate. Example networks are discussed in more detail below in relation to FIGS. 11-12.

As mentioned above, the environment 100 includes the client device 108. The client device 108 can be one of a variety of computing devices, including a smartphone, a tablet, a smart television, a desktop computer, a laptop computer, a virtual reality device, an augmented reality device, or another computing device as described in relation to FIGS. 11-12. The client device 108 can communicate with the server(s) 104 via the network 112. For example, the client device 108 can receive user input from a user interacting with the client device 108 (e.g., via the editing application 110) to, for instance, input a prompt or to select user interface elements for interacting with the content management system 106 (e.g., for submitting a search request). In addition, the client device 108 can provide, and the proxy-based streaming edit system 102 can receive, information relating to the various interactions via the editing application 110 (e.g., for indicating a digital video file or editing operations to a digital video file).

As shown, the client device 108 can include the editing application 110. In particular, the editing application 110 may be a web application, a native application installed on the client device 108 (e.g., a mobile application, a desktop application, etc.), or a cloud-based application where all or part of the functionality is performed by the server(s) 104. Based on instructions from the editing application 110, the client device 108 can present or display information, including a user interface for editing digital video(s). Using the client application, the client device 108 can perform (or request to perform) various operations, such as selecting digital video files from the content management system 106, editing specific frames of a digital video file, or stitching together digital video files.

As illustrated in FIG. 1, the environment 100 also includes the server(s) 104. The server(s) 104 may generate video proxies, modify video proxies, fetch instructions from video proxies, and stream digital videos from the content management system 106. For example, the server(s) 104 may receive an indication from the client device 108 of selecting a digital video file from the content management system 106 and generate a video proxy that corresponds to the selected digital video file. In addition, the server(s) 104 can transmit data to the client device 108 by streaming the digital video file from the content management system 106. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, container orchestration servers, communication servers, web-hosting servers, machine learning server, and other types of servers.

As shown in FIG. 1, the server(s) 104 can also include the proxy-based streaming edit system 102 as part of the content management system 106. The content management system 106 can communicate with the client device 108 to perform various functions associated with the editing application 110 such as locating content items, sharing video compositions with the additional client device(s) 114, and streaming digital videos. Indeed, the content management system 106 can include a network-based smart cloud storage system to manage, store, and maintain content items and related data across numerous user accounts. In some embodiments, the proxy-based streaming edit system 102 and/or the content management system 106 utilize a database to store and access information such as content items, video proxies, meta video proxy layers, editing operations, and activity performed by one or more computing devices.

As further illustrated, the environment 100 includes the additional client device(s) 114. In particular, the additional client device(s) 114 includes one or more computing devices that communicate and exchange data with the client device 108. For example, the additional client device(s) 114 can include collaborating client devices that collaborate to provide feedback to one or more video compositions. For instance, the client device 108 can indicate to the proxy-based streaming edit system 102 to send a link from the content management system 106 to the additional client device(s) 114.

Although FIG. 1 depicts the proxy-based streaming edit system 102 located on the server(s) 104, in some implementations, the proxy-based streaming edit system 102 may be implemented by (e.g., located entirely or in part on) one or more other components of the environment 100. For example, the proxy-based streaming edit system 102 may be implemented by the client device 108, the additional client device(s) 114, and/or a third-party system. For example, the client device 108 and/or a third-party system can download all or part of the proxy-based streaming edit system 102 for implementation independent of, or together with, the server(s) 104.

In some implementations, though not illustrated in FIG. 1, the environment 100 may have a different arrangement of components and/or may have a different number or set of components altogether. For example, the client device 108 may communicate directly with the proxy-based streaming edit system 102, bypassing the network 112. In addition, the environment 100 can include a database located external to the server(s) 104 (e.g., in communication via the network 112) or located on the server(s) 104 and/or on the client device 108.

Figure 2:
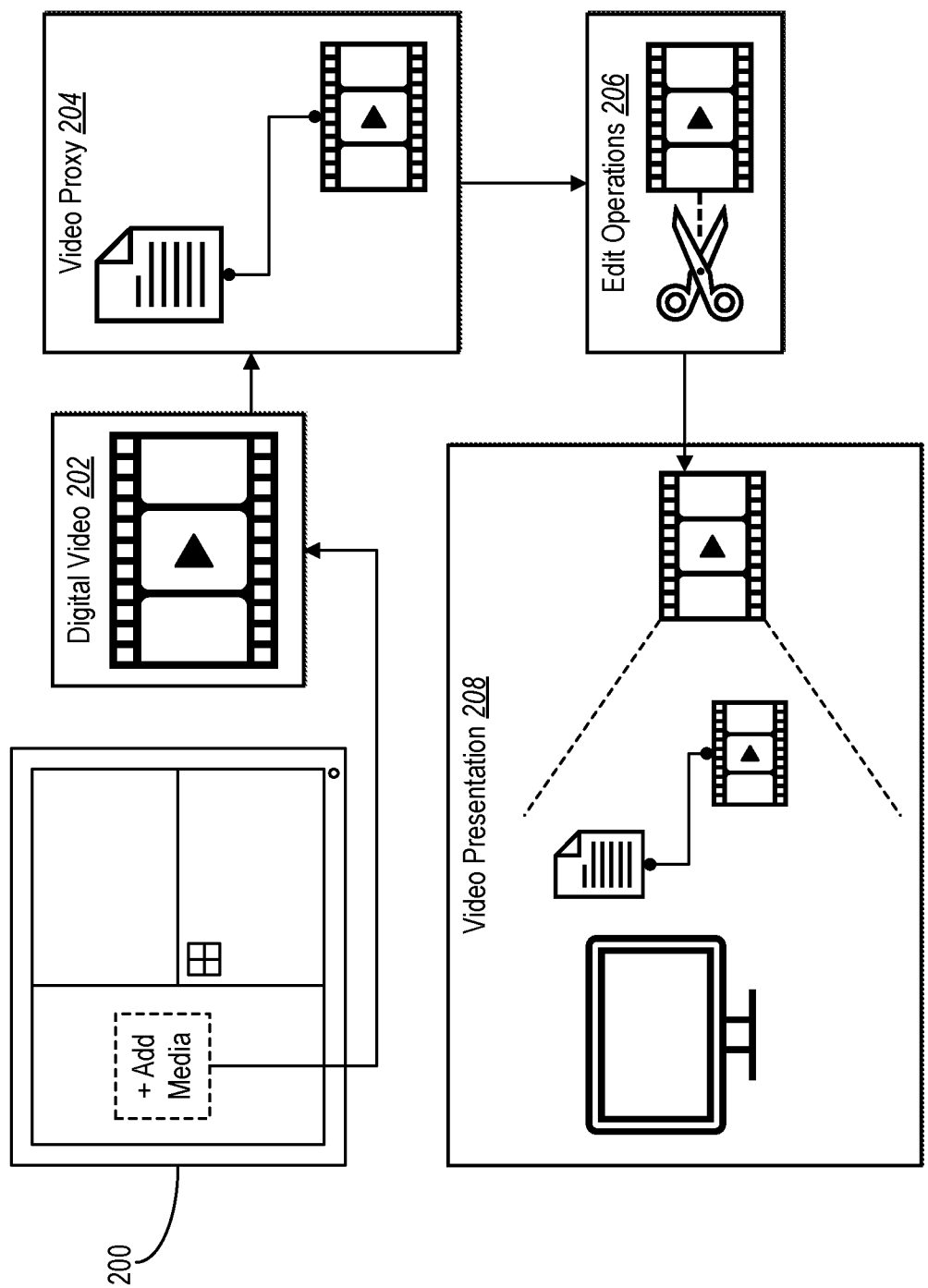
FIG. 2 illustrates an example overview of the proxy-based streaming edit system providing a streamed presentation of a digital video according to a video proxy in accordance with one or more embodiments.

As mentioned above, the proxy-based streaming edit system 102 receives a request to edit a digital video and in response modifies a video proxy to include computer instructions defining edit parameters. FIG. 2 illustrates an overview of proxy-based streaming edit system 102 providing a streamed presentation of a video proxy for a digital video in accordance with one or more embodiments. Additional detail regarding the various acts and processes described in relation to FIG. 2 is provided thereafter with reference to subsequent figures.

FIG. 2 shows the proxy-based streaming edit system 102 providing a web-based video editor 200. In one or more embodiments, the term "web-based video editor" refers to a web application that allows a user to edit and manipulate digital video content directly through the web browser. Specifically, the web-based video editor 200 refers to an application that operates online (e.g., without an application installed on a client device). For example, the web-based video editor 200 contains editing tools, features, and storage of video edits accessed and utilized via the web browser. For instance, the web-based video editor 200 allows a client device to upload one or more digital videos, add effects to the one or more digital videos, edit the audio, and share/collaborate with additional client devices.

Further, FIG. 2 shows the proxy-based streaming edit system 102 receiving a selection of an indication to add media to the web-based video editor 200. For instance, the indication to add media includes an indication to add a digital video 202. In one or more embodiments, "a digital video" refers to a sequence of visual images or frames encoded and stored in a digital format. Specifically, the digital video 202 can include moving visual content and audio (e.g., music or sound effects). For example, the digital video 202 can further include effects to transition from one frame to another and/or special effects (e.g., showing an animation or computer-generated visualization). Further, the digital video 202 can include properties such as resolutions (720p, 1080p, 4K, etc.), aspect ratios (e.g., proportional relationship between the width and height of the digital video), and compression (e.g., file size variation for efficient storage and transmission).

Moreover, FIG. 2 shows the proxy-based streaming edit system 102 generating a video proxy 204 from the digital video 202. In one or more embodiments, "a video proxy" refers to a pointer or reference to a content item in a cloud-based location. Specifically, the video proxy 204 includes computer instructions that point to a content item and in some embodiments, further includes computer instructions. For instance, the computer instructions of the video proxy 204 define edit parameters of an editing operation. In other words, the video proxy 204 refers to a pointer with a list of edit instructions. For example, the proxy-based streaming edit system 102 can stream the digital video 202 according to the video proxy 204 and uses the video proxy as an instruction filter to show the digital video 202 that depicts modifications defined by editing operations within the video proxy 204. In some embodiments, the video proxy 204 is referred to as an edit description list (e.g., a list of edit instructions to be applied to a file).

In addition, FIG. 2 shows the proxy-based streaming edit system 102 receiving an indication to apply edit operations 206 to the digital video 202. For instance, the proxy-based streaming edit system 102 modifies the video proxy 204 to include the computer instructions defining edit parameters of the edit operations 206. Additional details of modifying the video proxy 204 is given below in the description of FIGS. 4 and 5.

Further, FIG. 2 shows the proxy-based streaming edit system 102 providing a video presentation 208 of the digital video 202 (e.g., to a client device editing the digital video 202 or to a collaborator client device). For instance, the proxy-based streaming edit system 102 streams the digital video 202 from the content management system 106 according to the video proxy 204. In one or more embodiments, "a streamed presentation" refers to accessing and presenting content item(s) (e.g., audio, digital video, or other content item types) directly from a remote server (e.g., a cloud) over the internet (e.g., via a web browser) without downloading the content item(s). Specifically, the proxy-based streaming edit system 102 provides the streamed presentation of the content without exporting or downloading any content items by referencing the cloud-based location(s) of content item(s) and depicting modifications in the content items as defined by editing operations.

Although FIG. 2 describes the video editing interface as a web-based video editor, in some embodiments, the proxy-based streaming edit system 102 utilizes a native application (e.g., downloaded on the client device). Specifically, the proxy-based streaming edit system 102 provides the native application to a client device to apply editing operations to the digital video 202. For example, the proxy-based streaming edit system 102 utilizes the native application by configuring it to operate through a cloud connection to the content management system 106. In other words, the proxy-based streaming edit system 102 streams digital videos via a native application (with network access) according to a video proxy.

Figure 3B:
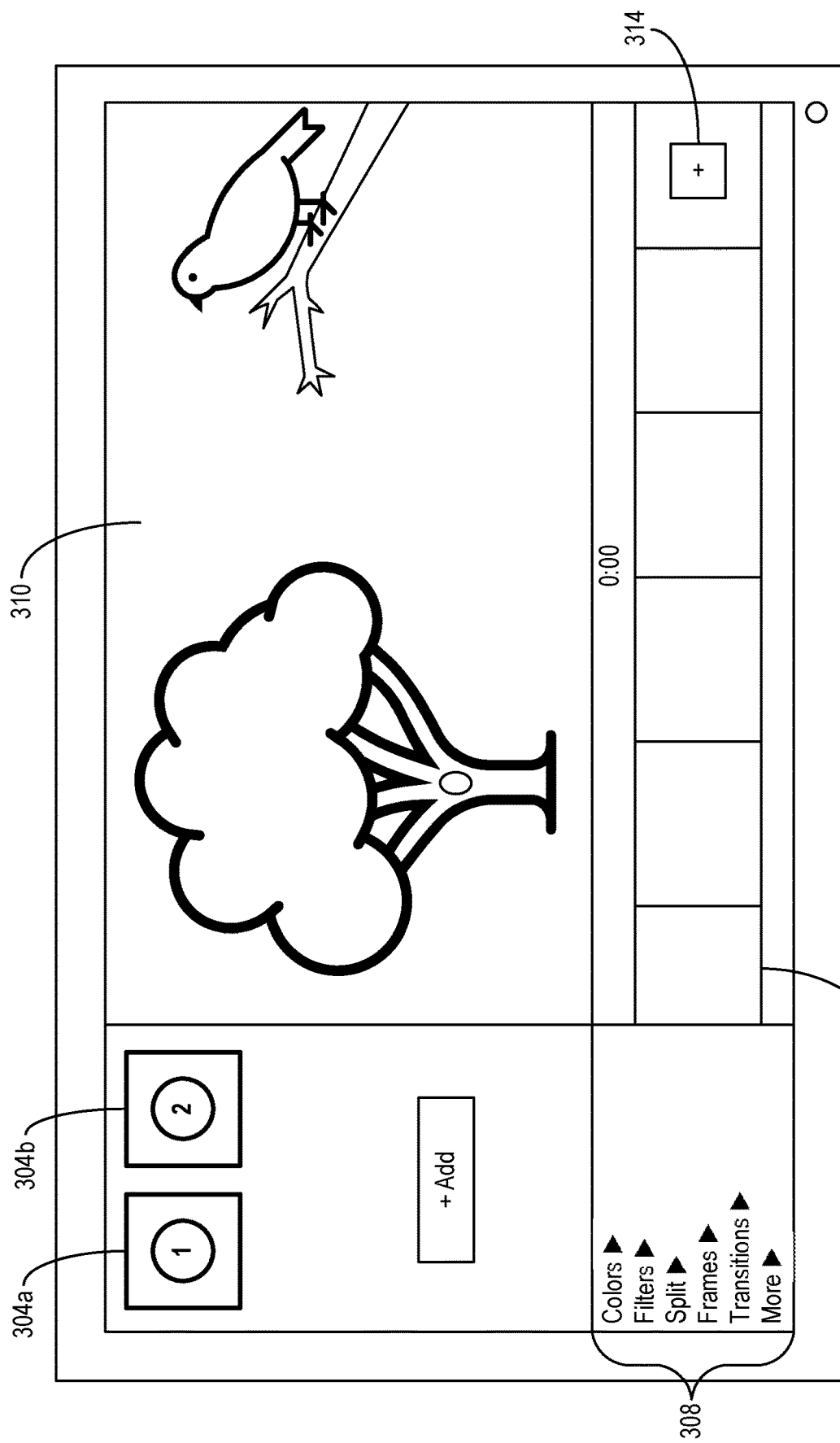

As mentioned above, in certain embodiments, the proxy-based streaming edit system 102 provides an end-to-end video editing interface (e.g., a web-based video editor). In particular, the proxy-based streaming edit system 102 provides an interface for a client device to select one or more content items and apply editing operations to the one or more selected content items. FIGS. 3A-3B illustrates an example graphical user interface of an interface for selecting digital video files and applying one or more editing operations in accordance with one or more embodiments.

As shown in FIG. 3A, the proxy-based streaming edit system 102 causes a client device 300 to display via a graphical user interface 302 the web-based video editor. For instance, FIG. 3A shows a plurality of digital videos 304 for the client device 300 to select from. Specifically, the proxy-based streaming edit system 102 stores the plurality of digital videos 304 in the content management system 106. In one or more embodiments, the term "content management system" refers to a set of software applications, network devices, and cloud data management servers, that facilitate the storage, creation, modification, sharing, collaboration, and organization of digital content items. For example, the content management system 106 provides a central point to manage a plurality of content items that contain text, images, videos, and various types of content. In one or more embodiments, the content management system 106 contains a large volume of digital video. In other words, a client device connected with the content management system 106 can edit digital video files stored in the content management system 106.

As mentioned, the proxy-based streaming edit system 102 accesses digital video files stored in a cloud-based location of the content management system 106. In one or more embodiments, the term "cloud-based location" refers to storing a content item on a remote server. Specifically, the proxy-based streaming edit system 102 allows a client device to upload content items to a cloud-based location and to access a content item stored in a cloud-based location by streaming the content item from the remote server to the client device. For example, multiple client devices can access a content item stored in a cloud-based location via a web browser or another web application synchronized with the cloud-based location.

In addition, FIG. 3A shows the proxy-based streaming edit system 102 providing an add element 306. Specifically, in response to a selection of the add element 306, the proxy-based streaming edit system 102 allows the client device 300 to indicate a location outside of the content management system 106. For example, if the proxy-based streaming edit system 102 receives a selection of a content item outside of the content management system 106, the proxy-based streaming edit system 102 can upload the indicated content item to the content management system 106 and then stream the uploaded content item to the web-based video editor.

As shown in FIG. 3A, the proxy-based streaming edit system 102 receives a selection of a first digital video 304a and a second digital video 304b. Specifically, the first digital video 304a can include a digital video depicting a bird flying onto a nearby tree branch and the second digital video 304b can include a scene of ocean waves hitting a beach.

FIG. 3B illustrates the proxy-based streaming edit system 102 causing the graphical user interface 302 to transition to showing the selected digital videos (e.g., the first digital video 304a and the second digital video 304b). Specifically, the proxy-based streaming edit system 102 can receive an indication to stitch the first digital video 304a to the second digital video 304b. In one or more embodiments, "stitching" refers to a process of combining or merging two separate digital files. Specifically, stitching can include splicing a first digital video and inserting a second digital video in between, cutting off a portion of a first digital video to generate a modified first digital video and attaching a second digital video to the end of the modified first digital video, or any other combination of combining/merging one or more digital videos.

Further, as shown in FIG. 3B, the proxy-based streaming edit system 102 provides editing operations 308. In one or more embodiments, "an editing operation" refers to a modification or change to a digital video. Specifically, the editing operation 308 includes a change of a color, a transition, a filter, or a framing of a digital video. For example, the editing operation 308 includes adding a text box to a frame of the digital video, changing the zoom level of a frame of the digital video, splicing the digital video and adding another digital video in between, and adding an effect between frames of the digital video.

To illustrate, the client device can indicate modifying a color of the bird from blue to green, adding a lightening filter to one of the frames in the bird video, and splitting the last two seconds of the bird video from the rest of the video. Moreover, the client device can further indicate removing the last two seconds of the bird video and adding the beach video to the end of the modified bird video. For instance, the client device can indicate to add a frame to the beach video and one or more additional transition effects within the beach video. As shown in FIG. 3B, the proxy-based streaming edit system 102 causes the graphical user interface 302 to display a scene 310 from the digital videos, specifically, FIG. 3B shows the scene of the bird perched on a nearby tree branch. Further, FIG. 3B shows a timeline 312 to scroll between different frames of the digital videos and an add element 314 to add an additional content item to the digital videos being edited.

Although FIGS. 3A-3B show the proxy-based streaming edit system 102 starting from a "blank slate" and receiving an indication to add the first digital video 304a and the second digital video 304b, in some embodiments, the proxy-based streaming edit system 102 provides an option to select from a digital video template. Specifically, a "digital video template" refers to a pre-defined structure or framework that operates as a starting point for creating digital video content. For example, the digital video template can include placeholders for text elements, image elements, video clip elements, transitions, and additional auditory or visual elements. For instance, the digital video template can include different categories of layout, text, transitions/effects, color schemes, duration, and audio effects.

In one or more embodiments, the proxy-based streaming edit system 102 provides an option for a client device to submit a query describing the type of digital video or digital video template. Specifically, the proxy-based streaming edit system 102 receives the query, generates computer instructions via a language machine learning model, and identifies a digital video or digital video template that conforms with the computer instructions.

In addition, in some embodiments, the proxy-based streaming edit system 102 identifies a digital video or a digital video template (based on the submitted query) by parsing through content items stored in the content management system 106. For instance, in some embodiments, the proxy-based streaming edit system 102 identifies a digital video template based on an indicated aspect ratio within the submitted query.

Furthermore, although FIGS. 3A and 3B describe the client device indicating one or more editing operations, in some embodiments this indication includes utilizing machine learning models to indicate the editing operations.

As used herein, the term "machine learning model" includes or refers to a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

Specifically, the proxy-based streaming edit system 102 detects the selection of digital videos (e.g., the first digital video 304a and the second digital video 304b) and transcribes the audio utilizing a transcription model. For example, the proxy-based streaming edit system 102 provides the transcribed text to the client device 300 and allows a user to edit the transcribed text which subsequently modifies the digital videos. Furthermore, in some embodiments, the proxy-based streaming edit system 102 provides the option to submit queries to edit the digital videos. For instance, the proxy-based streaming edit system 102 can receive rudimentary edits such as a query to add text, titles, and transitions to the digital videos. Further, in some instances, the proxy-based streaming edit system 102 can receive a query to record media for the digital video, to enhance audio, to generate a voice-over, or to remove filler words.

For instance, the proxy-based streaming edit system 102 utilizes a transcription model as described in in application Ser. No. 18/469,357 titled GENERATING LARGE LANGUAGE MODEL OUTPUTS FROM STORED CONTENT ITEMS filed on Sep. 18, 2023, which is incorporated by reference in its entirety herein.

As mentioned above, in some embodiments, the proxy-based streaming edit system 102 generates a video proxy for a digital video. For example, FIG. 4 illustrates an example diagram of the proxy-based streaming edit system 102 generating a video proxy for a first digital video stitched to a second digital video in accordance with one or more embodiments.

FIG. 4 shows a video composition 400 of a first digital video and a second digital video. As used herein, the term "video composition" refers to one or more digital videos. Specifically, the video composition 400 can include a single digital video with one or more editing operations applied to the single digital video or multiple digital videos with multiple editing operations applied to one or more of the multiple digital videos. Accordingly, the video composition 400 is an umbrella term for one or more digital videos accessed via the video editor (e.g., the web-based video editor).

For instance, FIG. 4 shows a video proxy 402 that includes computer instructions defining edit parameters for the video composition 400. In one or more embodiments, "computer instructions" refers to a set of instructions that a computing device can interpret and execute to perform a specific task. In particular, computer instructions include a series of statements and functions that define edit operations (e.g., splice, modify a color, add a transition effect, etc.). For example, in response to an editing operation, the proxy-based streaming edit system 102 generates computer instructions that corresponding to the editing operation.

As mentioned above, an editing operation refers to a modification or change to a digital video. In addition, in one or more embodiments, "edit parameters" refers to specific details relating to an editing operation. Specifically, the edit parameters include coordinates, timestamp data, a modification type, and storage location data. In other words, the edit parameters indicate the specific instructions for the proxy-based streaming edit system 102 to carry out the editing operation.

FIG. 4 illustrates an example of the proxy-based streaming edit system 102 generating the video proxy 402 in accordance with the example given above in FIGS. 3A-3B. Specifically, the client device starts from a "blank slate" and selects two digital videos, and the system generates the video proxy 402 for the two digital videos. For example, the video proxy 402 shows a digital video 404 with an identifier (IVyhCf3aX00), a resolution (3160×3840 e.g., 4K), and a duration (50.27). Further, the video proxy 402 shows clip digital video 406 which also includes an identifier (Dac40717-34d3) and an indication to clip the digital video 404 starting at 1.1. Moreover, the video proxy 402 also includes an indication to stitch an additional digital video 408 to the clipped digital video. For instance, the additional digital video 408 includes an identifier (m34006L2mOP), a resolution (2160×3840), and a duration (10.5).

Optionally, FIG. 4 shows the video proxy 402 could include additional editing operations prior to stitching the additional digital video 408. Specifically, FIG. 4 shows a filter operation 410, a text box 412, and a color operation 414. For example, each of the operations can include a timestamp of when to start the operation (e.g., start) in the digital video 404, a duration for the operation to last, a style, a size, coordinates (e.g., where in the frame should a text box be positioned), etc.

As mentioned above, in some embodiments, the proxy-based streaming edit system 102 generates a meta video proxy layer. FIG. 5 shows the proxy-based streaming edit system 102 generating a meta video proxy layer for a video composition in accordance with one or more embodiments. In contrast to FIG. 4, FIG. 5 illustrates an example embodiment of a client device selecting a digital video, indicating editing operations, the proxy-based streaming edit system 102 generating a video proxy for the selected digital video, the client device selecting an additional digital video, indicating additional editing operations, and the proxy-based streaming edit system 102 generating an additional video proxy.

FIG. 5 shows a video composition 500 that involves multiple digital videos. Specifically, the video composition 500 shows the proxy-based streaming edit system 102 stitching together three digital videos. For example, FIG. 5 shows the proxy-based streaming edit system 102 generating a meta video proxy layer 502 for the video composition 500.

In one or more embodiments, "a meta video proxy layer" refers to a high-level abstraction layer that sits on top of additional layers to manage the underlying layers. Specifically, the meta video proxy layer 502 can include a video proxy or multiple video proxies where the video proxy or the multiple video proxies refers to another video proxy. For example, the meta video proxy layer 502 also functions as an edit description list that points to or references one or more digital videos in cloud-based locations and applies editing operations to one or more digital videos. Thus, in some embodiments where the video proxy refers to another video proxy, the video proxy is a meta video proxy layer.

To illustrate, FIG. 5 shows the meta video proxy layer 502 that includes a first video proxy 504 that refers to a second video proxy 506, and the second video proxy 506 refers to a third video proxy 508. For instance, the first video proxy 504 can include an indication to clip a few seconds of a first digital video, add a text box, and refer to the second video proxy 506 (e.g., in order to transition from the first digital video to a second digital video.

Further, the second video proxy 506 can include an indication to add a frame to the second digital video, clip a few minutes off the second digital video and refer to the third video proxy 508 (e.g., in order to transition from the second digital video to a third digital video). Moreover, the third video proxy 508 can include an indication to add effects to multiple frames of the third digital video, add a transition between frames of the third digital video, and refer to the first video proxy 504 (e.g., to refer to the clipped few seconds of the first digital video). Thus, although FIG. 5 shows three video proxies within the meta video proxy layer 502, in some embodiments, the meta video proxy layer 502 includes more video proxies. Further, in some embodiments, the meta video proxy layer 502 includes two video proxies, where at least one of the video proxies refers to another video proxy.

Figure 6:
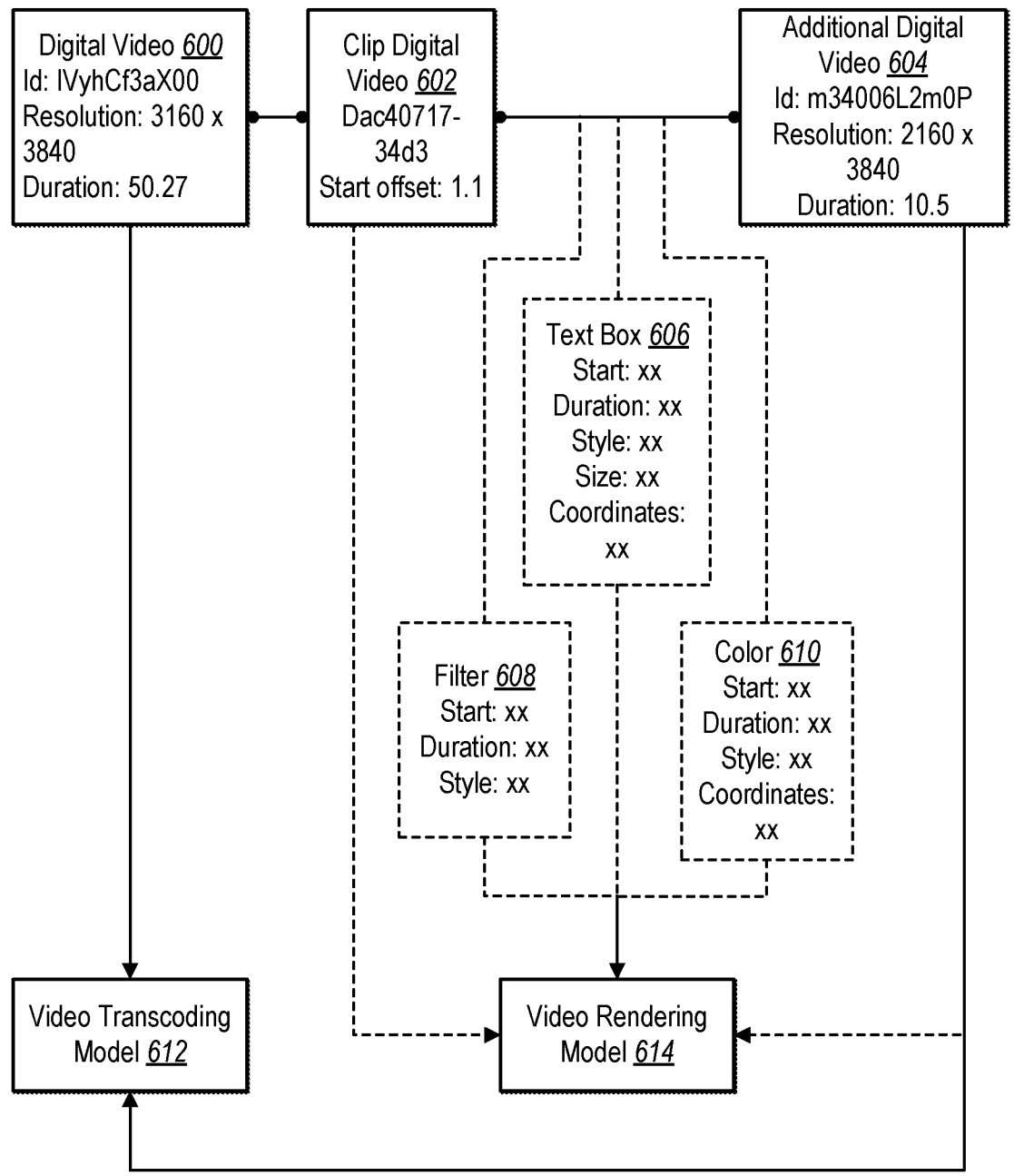
FIG. 6 illustrates an example diagram of the proxy-based streaming edit system utilizing a video transcoding model and a video rendering model to present the digital video according to the video proxy in accordance with one or more embodiments.

As mentioned above, in some embodiments, the proxy-based streaming edit system 102 utilizes a video transcoding model and a video rendering model to stream a digital video to a client device. FIG. 6 illustrates an example diagram of the proxy-based streaming edit system 102 utilizing a video transcoding model and a video rendering model 614 to stream a presentation of a video proxy in accordance with one or more embodiments. FIG. 6 shows the video proxy (e.g., like the one shown in FIG. 4) that includes a digital video 600, a clip digital video 602, and an additional digital video 604. Further, FIG. 6 shows editing operations such as a filter operation 608, a text box 606, and a color operation 610.

As shown in FIG. 6, the proxy-based streaming edit system 102 utilizes a video transcoding model 612. Specifically, the proxy-based streaming edit system 102 identifies a selected video (e.g., at editing time or when presenting the digital video) and utilizes the video transcoding model 612 to transcode a digital video into a stream-able resolution and format for presentation within the web-based video editor or a video presentation interface. For example, FIG. 6 shows the proxy-based streaming edit system 102 utilizing the video transcoding model 612 for the digital video 600 and the additional digital video 604. For instance, the proxy-based streaming edit system 102 utilizes the video transcoding model 612 to stream the digital video 600 and the additional digital video at a 4K (e.g., 3160×3840) resolution. Moreover, the proxy-based streaming edit system 102 utilizes the video transcoding model 612 to segment each digital video and buffer (e.g., temporarily storing a segment of the video data before playing the segment to ensure smooth and uninterrupted streaming) each segment.

In one or more embodiments, because the proxy-based streaming edit system 102 utilizes the video transcoding model 612, the proxy-based streaming edit system 102 avoids having to deal with compatibility issues between different digital video file types and permission roadblocks. For instance, the proxy-based streaming edit system 102 utilizes the video transcoding model 612 makes varying digital video files compatible and also speeds up the process of being able to access multiple different digital video files. To illustrate, the proxy-based streaming edit system 102 utilizes the video transcoding model 612 to convert digital video files as they are uploaded to the content management system 106 without further input from a client device. Thus, in some embodiments, the proxy-based streaming edit system 102 pre-converts digital video files prior to editing such that a client device can seamlessly begin editing upon selecting a digital video file. For instance, the proxy-based streaming edit system 102 utilizes the video transcoding model 612 as described in application Ser. No. 18/469,357 titled GENERATING LARGE LANGUAGE MODEL OUTPUTS FROM STORED CONTENT ITEMS filed on Sep. 18, 2023, which is incorporated by reference in its entirety herein.

FIG. 6 also shows the proxy-based streaming edit system 102 utilizes a video rendering model 614. Specifically, the proxy-based streaming edit system 102 utilizes the video rendering model 614 to composite any edits made to the video stream. For example, the proxy-based streaming edit system 102 utilizes the video rendering model 614 to reference the video proxy and/or the meta video proxy layer (e.g., that defines operations) to fetch digital videos and/or operations to apply within digital videos while a video composite is being presented/streamed at a client device.

In some embodiments, the video rendering model 614 includes a JavaScript API (OpenGL or WebGL) designed for rendering three-dimensional or two-dimensional graphics within a web browser, specifically a web-based video editor. For example, FIG. 6 shows the proxy-based streaming edit system 102 utilizing the video rendering model 614 for the edit operations (e.g., filter operation 608, text box 606, color operation 610, the clip digital video 602, and the additional digital video 604). For instance, the proxy-based streaming edit system 102 uses the video rendering model 614 to start the streaming the digital video 600 starting at 1.1 and further modifies the stream using the video rendering model 614 as instructed by a video proxy (e.g., the video rendering model 614 generally includes initialization for providing context for rendering one or more elements, buffers to store data, textures to map onto the digital video, and a rendering loop to continuously update and render a scene within the digital video).

Figure 7:
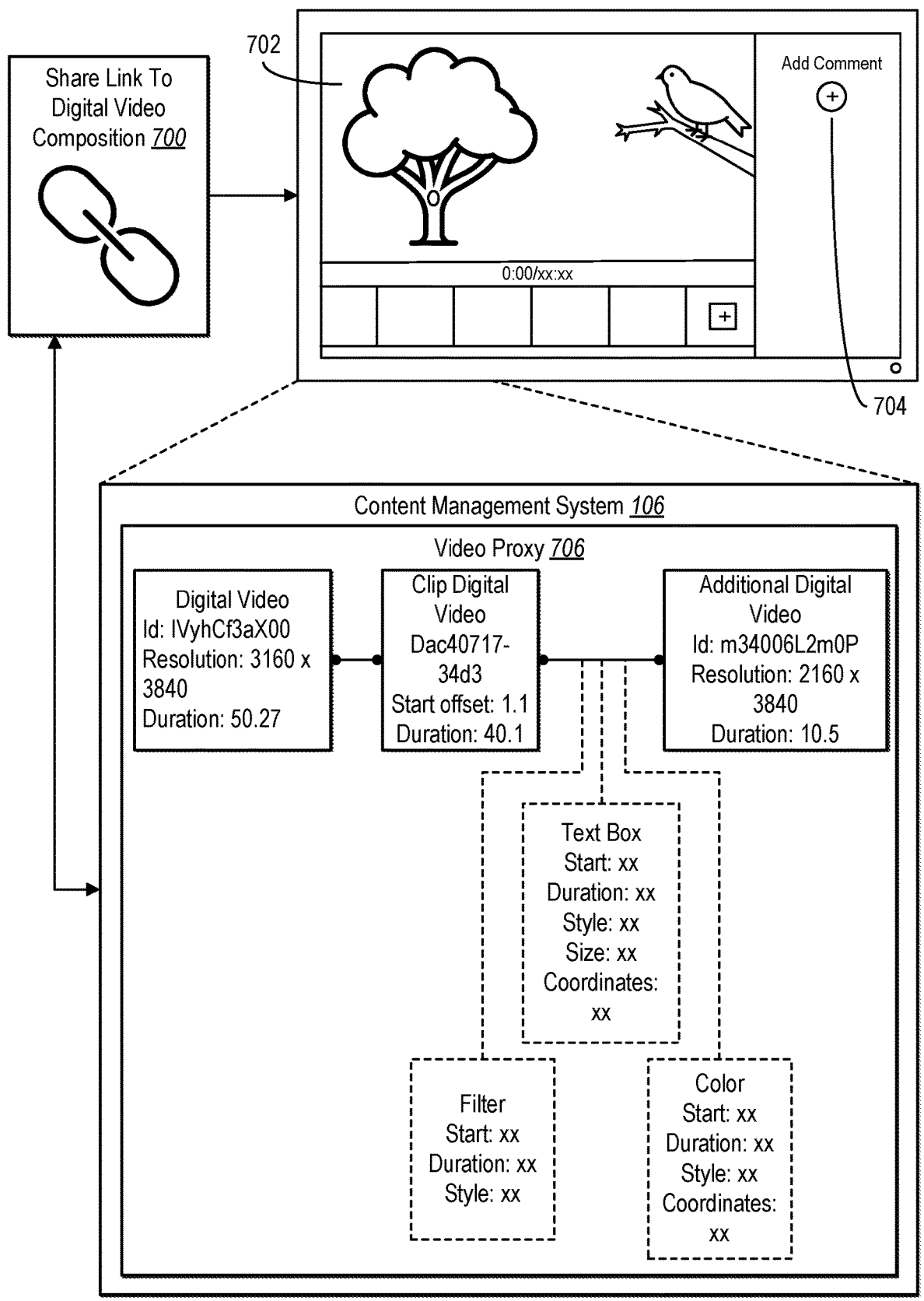
FIG. 7 illustrates an example diagram of the proxy-based streaming edit system sending a link to a client device to stream a digital video modified to included edit parameters in accordance with one or more embodiments.

As mentioned above, the proxy-based streaming edit system 102 provides a link to a collaborator device to stream the video composition. FIG. 7 illustrates an example diagram of the proxy-based streaming edit system 102 sending a link to a client device from the content management system that includes a link to a video proxy in accordance with one or more embodiments.

FIGS. 3A-3B above described a client device selecting a first digital video and a second digital video to perform one or more editing operations. In some embodiments, the process described in FIGS. 3A-3B further includes an option to add one or more collaborator client devices to the video editing project. For instance, the proxy-based streaming edit system 102 also provides an option in selecting one or more collaborator devices to indicate whether the collaborator device has view-only permissions or view and comment permissions.

FIG. 7 shows the proxy-based streaming edit system 102 via the content management system 106 providing a link 700 to the video composition. In one or more embodiments, "a link" refers to a connection to a web-based item. Specifically, the link 700 includes a selectable element that when selected directs a client device to another location. For example, in response to selecting the link 700, a client device can collaborate by modifying content at the link or leaving comments. Further, the client device can stream the content according to a video proxy 706 that depicts modifications defined by the editing operation. Moreover, the client device can export the digital video according to the video proxy 706.

As shown in FIG. 7, in response to selecting the link 700, the proxy-based streaming edit system 102 causes the client device to display a video composition 702. For instance, the video composition starts with the digital video of the bird perching on a nearby branch. Furthermore, as indicated in FIG. 7, the collaborator client device has permission to add comments to the video composition. Specifically, the proxy-based streaming edit system 102 provides a comment element 704, and in response to a selection of the comment element 704, the proxy-based streaming edit system 102 adds a comment tied to a timestamp and/or a coordinate position within the video composition 702. For instance, the collaborator client device can click on a specific frame and add a comment that applies to the entire frame or add a comment that applies to a specific coordinate position within the frame.

FIG. 7 further shows a double arrow between the link 700 and the content management system 106. Specifically, the double arrow indicates that the proxy-based streaming edit system 102 detects updates to the video proxy 706 and intelligently updates the link 700 to reflect the updates. For example, the editing client device can send the link 700 to the collaborator client device and then perform additional edits to the video composition 702. In some embodiments, the proxy-based streaming edit system 102 updates the link 700 to include the subsequent edits to the video composition 702 (e.g., without sending an additional link to the collaborator client device). In some embodiments, if the collaborator client device is in the process of viewing/commenting on the video composition 702, the proxy-based streaming edit system 102 provides an update notification to the collaborator client device regarding the update to the video proxy 706.

Additionally, FIG. 7 illustrates the proxy-based streaming edit system 102 storing the video proxy 706 on the content management system 106. Specifically, the proxy-based streaming edit system 102 stores the video proxy 706 in an additional cloud-based location of the content management system 106 dedicated to video proxies. In doing so, the proxy-based streaming edit system 102 allows for intelligent detection of a editor client device wanting to edit an already existing video proxy.

For example, either post-export or pre-export of a video composition, the proxy-based streaming edit system 102 can provide a video proxy to an editor client device. For instance, if the proxy-based streaming edit system 102 detects an editor client device editing a digital video previously edited (e.g., there is a video proxy on the content management system 106 that references the digital video currently being edited), the proxy-based streaming edit system 102 provides an option for the editor client device to open a project with the video proxy identified on the content management system 106. In other words, the proxy-based streaming edit system 102 captures video proxy snapshots for saving and resuming editing of a video composition before or after publishing/exporting.

Figure 8:
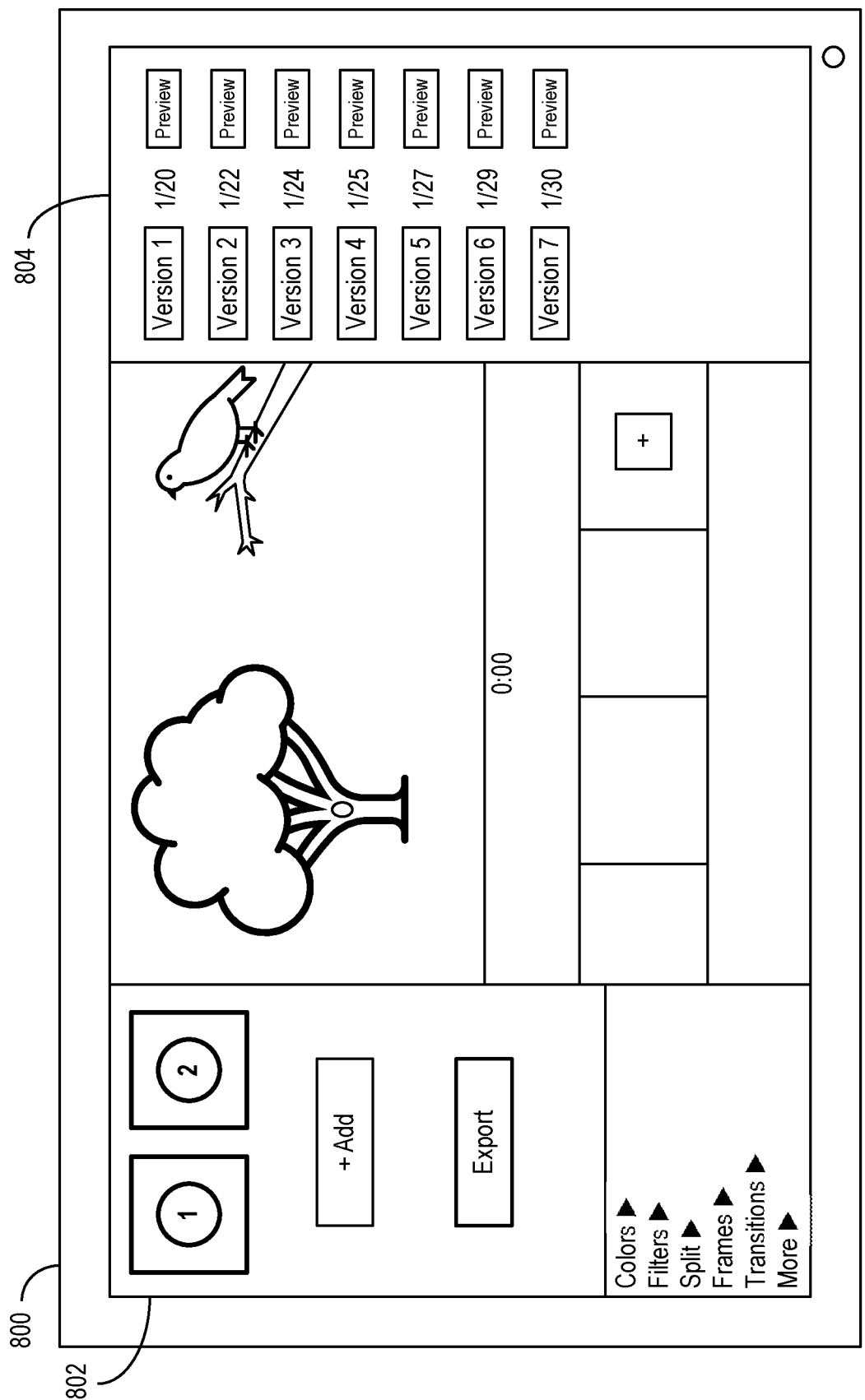
FIG. 8 illustrates an example graphical user interface of the proxy-based streaming edit system providing multiple versions of a video composition in accordance with one or more embodiments.

As just mentioned, the proxy-based streaming edit system 102 saves the video proxy to the content management system 106. FIG. 8 illustrates the proxy-based streaming edit system 102 providing multiple versions of a video editing project to an editor client device in accordance with one or more embodiments.

FIG. 8 shows a client device 800 that displays via a graphical user interface 802 a video composition and corresponding versions 804. For instance, the corresponding versions 804 indicates different video proxy versions at different times. In one or more embodiments, "a video proxy version" refers to different iterations or stages of a digital file. Specifically, the video proxy version refers to various stages of modifications or updates made to the video proxy. For example, if the video proxy initially includes two edit operations but two additional editing operations are added a few days later, then there would be two video proxy versions.

As illustrated, FIG. 8 shows seven video proxy versions each associated with a different day. Further, as shown, the proxy-based streaming edit system 102 allows an editor client device to select a preview element to preview the video composition according to a selected video proxy version. Moreover, in some embodiments, the proxy-based streaming edit system 102 allows an editor client device to restore a specific video proxy version.

Figure 9:
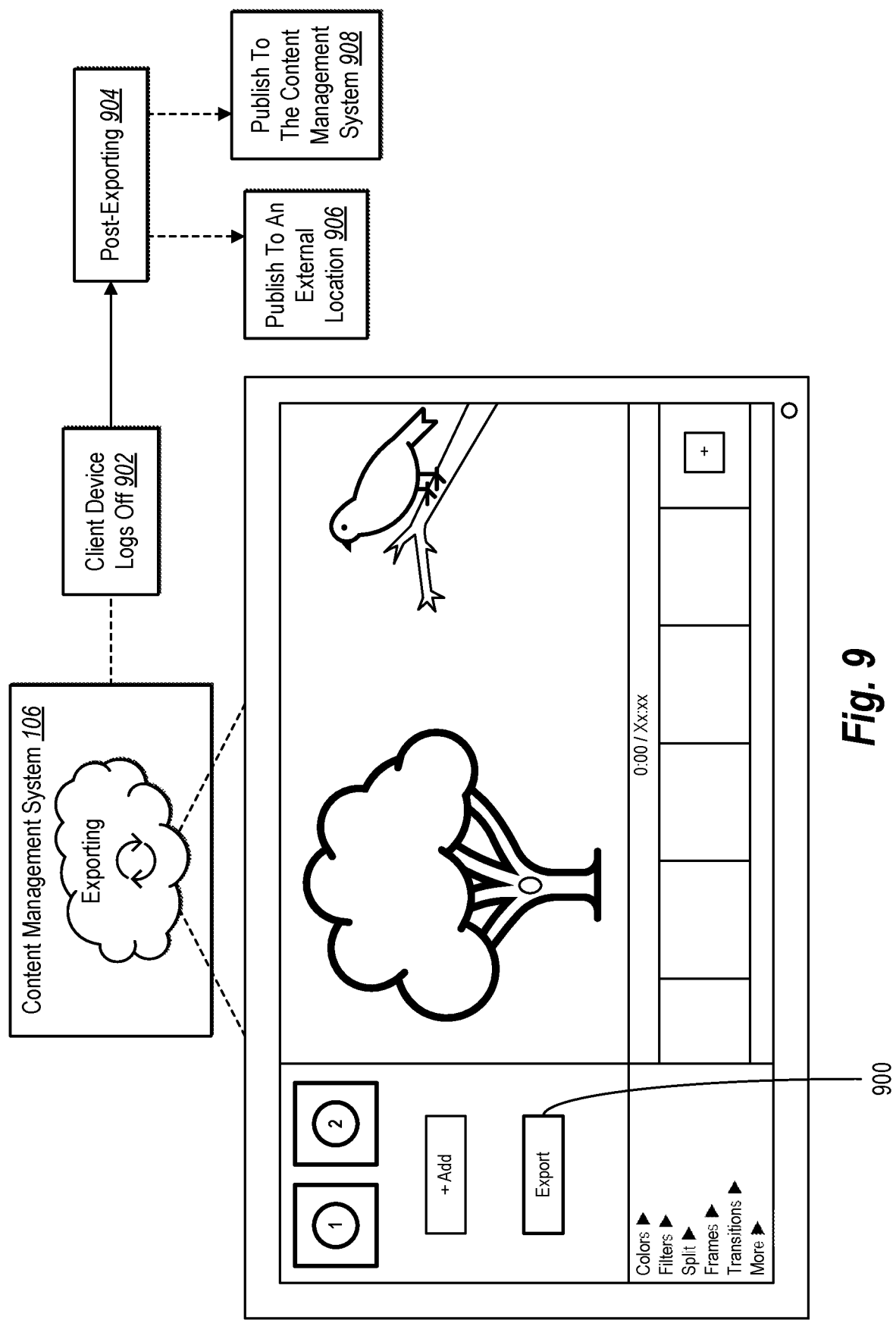
FIG. 9 illustrates an example diagram of the proxy-based streaming edit system exporting the digital video at the content management system in accordance with one or more embodiments.

As mentioned above, the proxy-based streaming edit system 102 can export a video composition at the content management system 106. FIG. 9 illustrates the proxy-based streaming edit system 102 exporting the video composition at the content management system while the client device logs off in accordance with one or more embodiments.

As shown, FIG. 9 illustrates an export element 900 that indicates to the proxy-based streaming edit system 102 to generate an exported digital video. In one or more embodiments, "an exported digital video" includes a rendered (e.g., generating the final image or frames of a scene or model into a visual format that can be viewed on a graphical user interface) and downloaded (e.g., converting from the video proxy file format to another file format) digital file. Specifically, the exported digital file refers to the proxy-based streaming edit system 102 generating a digital file in addition to the file stored in a cloud-based location. For example, the proxy-based streaming edit system 102 generates the exported digital video by downloading the digital video to a client device.

FIG. 9 illustrates the proxy-based streaming edit system 102 exporting the video composition at the content management system 106. In other words, the proxy-based streaming edit system 102 performs the rendering and downloading of the video composition in a cloud-based location and not at the local client device. Thus, as shown, even when a client device performs an act 902 of logging off, the proxy-based streaming edit system 102 continues to export the video composition at the content management system 106. Accordingly, the client device does not have to stay on the browser (e.g., can close out of the browser) or keep the client device operating for the export of the video composition to occur.

Moreover, FIG. 9 illustrates the proxy-based streaming edit system 102 performing additional post-exporting acts 904. Specifically, the proxy-based streaming edit system 102 can receive an indication from the client device to perform one or more acts after the video composition has been exported in the cloud-based location of the content management system 106. For instance, the proxy-based streaming edit system 102 can receive an indication to perform an act 908 of publishing the video composition to the content management system 106 and/or receive an indication to perform an act 906 of publishing the video composition to an external location. To illustrate, publishing to an external location includes the proxy-based streaming edit system 102 posting the video composition to one or more social media websites. Notable, these post-exporting actions can be performed without the client device operating.

Moreover, in some embodiments, the proxy-based streaming edit system 102 can receive an indication from the client device to send a link (e.g., via an email) to the client device for the published video composition (e.g., to the content management system 106 or to a social media website). Furthermore, in some embodiments, the proxy-based streaming edit system 102 provides an option for a client device to schedule publishing (e.g., post-export) a video composition to the content management system 106 or to a social media website.

Figure 10:
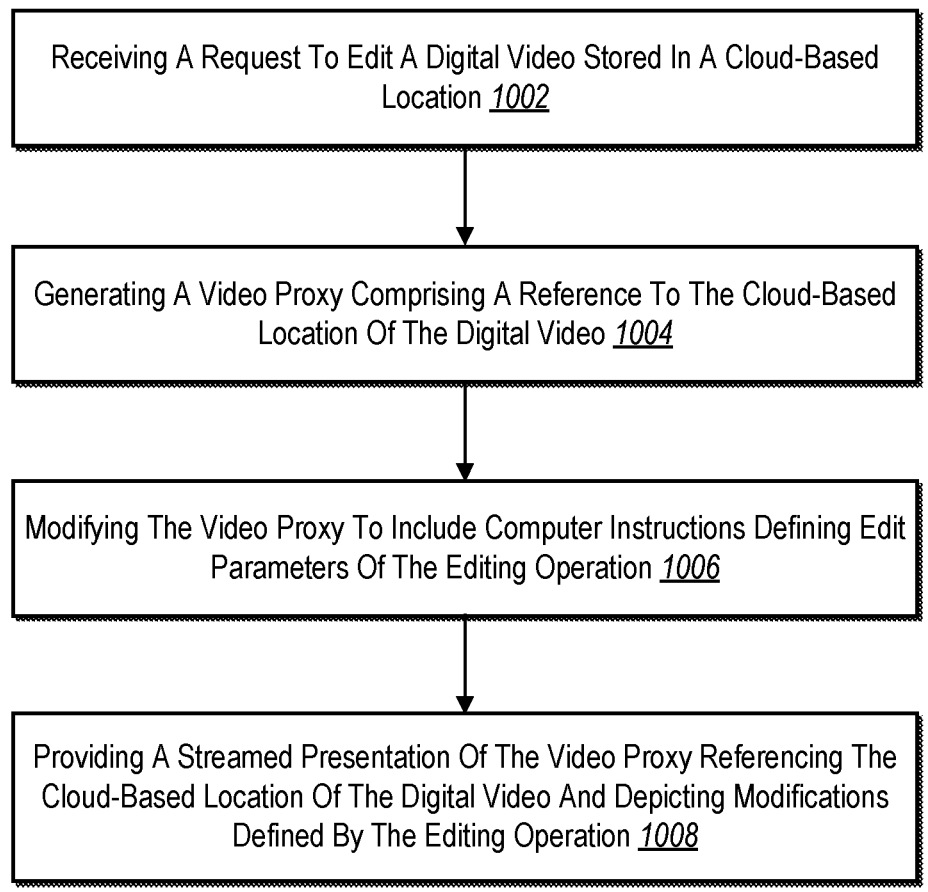
FIG. 10 illustrates an example series of acts performed by the proxy-based streaming edit system in accordance with one or more embodiments.

While FIG. 10 illustrates acts according to certain implementations, alternative implementations may omit, add to, reorder, and/or modify any of the acts shown in FIG. 10. The acts of FIG. 10 can be performed as part of a method. Alternatively, a non-transitory computer-readable medium can comprise instructions, that when executed by one or more processors, cause a computing device to perform the acts of FIG. 10. In still further implementations, a system can perform the acts of FIG. 10.

As illustrated in FIG. 10, a series of acts 1000 may include an act 1002 of receiving a request to edit a digital video stored in a cloud-based location, an act 1004 of generating a video proxy comprising a reference to the cloud-based location of the digital video, an act 1006 of modifying the video proxy to include computer instructions defining edit parameters of the editing operation, and an act 1008 of providing a streamed presentation of the video proxy referencing the cloud-based location of the digital video and depicting modifications defined by the editing operation.

In particular the act 1002 includes receiving, via a video editor application, a request to edit a digital video stored in a cloud-based location of a content management system. Further, the act 1004 includes generating, in response to the request, a video proxy comprising a reference to the cloud-based location of the digital video. Moreover, the act 1006 includes in response to an editing operation within the video editor application, modifying the video proxy to include computer instructions defining edit parameters of the editing operation. Additionally, the act 1008 includes providing, for display within an interface of the video editor application, a streamed presentation of the video proxy referencing the cloud-based location of the digital video and depicting modifications defined by the editing operation.

Further, in one or more embodiments, the series of acts 1000 includes receiving a selection of the digital video to stitch an additional digital video to the digital video. Additionally, in one or more embodiments, the series of acts 1000 includes the editing operation comprises an indication to stitch an additional digital video to the digital video and modifying the video proxy comprises defining the edit parameters to reference the additional digital video. Moreover, in one or more embodiments, the series of acts 1000 includes receiving the editing operation comprises receiving at least one modification indication to modify a color, a transition, a filter, or a framing within the digital video and modifying the video proxy comprises defining the edit parameters to reference the at least one modification indication. Further, in some embodiments, the series of acts 1000 includes referencing an additional video proxy that further comprises additional computer instructions defining additional edit parameters for an additional digital video.

Furthermore, in one or more embodiments, the series of acts 1000 includes generating a meta video proxy layer that references the video proxy of the digital video and a plurality of additional video proxies corresponding to a plurality of additional digital videos, wherein each of the plurality of additional video proxies include corresponding editing operations to apply to a corresponding additional digital video. Additionally, in one or more embodiments, the series of acts 1000 includes wherein the video proxy is a meta video proxy layer and providing the streamed presentation of the meta video proxy layer. Further, in some embodiments, the series of acts 1000 includes referencing a video proxy set to provide the streamed presentation of the meta video proxy layer by fetching digital videos referenced by the video proxy set and applying editing operations indicated within the each of the video proxies within the video proxy set to the digital videos referenced by the video proxy set. Moreover, in one or more embodiments, the series of acts 1000 includes sending, to a client device, a link that references the video proxy. Further, in one or more embodiments, the series of acts 1000 includes in response to receiving, from the client device, an indication of a selection of the link, streaming the digital video modified to include the edit parameters of the editing operation without exporting the digital video.

Further, in one or more embodiments, the series of acts 1000 includes receiving, via a video editor application, a request to edit a plurality of digital videos stored in cloud-based locations of a content management system. Moreover, in one or more embodiments, the series of acts 1000 includes generating, in response to the request, a video proxy comprising a reference to the cloud-based locations of the plurality of digital videos. Additionally, in one or more embodiments, the series of acts 1000 includes in response to an editing operation within the video editor application, modifying the video proxy to include computer instructions defining edit parameters of the editing operation. Moreover, in one or more embodiments, the series of acts 1000 includes providing for display within an interface of the video editor application, a streamed presentation of the video proxy referencing the cloud-based locations of the plurality of digital videos and depicting modifications defined by the editing operation.

Moreover, in one or more embodiments, the series of acts 1000 includes receive the request to edit the plurality of digital videos further comprises a selection of a digital video template to modify by including the plurality of digital videos. Further, in one or more embodiments, the series of acts 1000 includes modifying the video proxy to include the computer instructions defining the edit parameters of a reference to transition from a first digital video of the plurality of digital videos to a second digital video of the plurality of digital videos. Moreover, in one or more embodiments, the series of acts 1000 includes receiving the editing operation comprises receiving a first modification indication to modify a first digital video of the plurality of digital videos and a second modification indication to modify a second digital video of the plurality of digital videos. Further, in one or more embodiments, the series of acts 1000 includes modifying the video proxy comprises defining the edit parameters to reference the first modification indication and the second modification indication.

Further, in one or more embodiments the series of acts 1000 includes referencing an additional video proxy that further comprises additional computer instructions defining additional edit parameters for an additional plurality of digital videos Further, in one or more embodiments, the series of acts 1000 includes receiving an indication to export the streamed presentation according to the video proxy. Moreover, in one or more embodiments the series of acts 1000 includes generating, at the content management system, an exported digital video of the streamed presentation by applying the computer instructions defining the edit parameters of the editing operation from the video proxy and storing the exported digital video in an additional cloud-based location of the content management system.

Furthermore, in one or more embodiments the series of acts 1000 includes storing the video proxy in an additional cloud-based location of the content management system. Moreover, in one or more embodiments, the series of acts 1000 includes in response to an indication to edit the plurality of digital videos either post-export or pre-export, providing the video proxy to a client device.

Moreover, in one or more embodiments, the series of acts 1000 includes receiving, via a video editor application of a first client device, a request to edit a digital video stored in a cloud-based location of a content management system. Further, in one or more embodiments the series of acts 1000 includes generating, in response to the request, a video proxy comprising a reference to the cloud-based location of the digital video. Further, in one or more embodiments, the series of acts 1000 includes in response to an editing operation within the video editor application, modifying the video proxy to include computer instructions defining edit parameters of the editing operation. Moreover, in one or more embodiments, the series of acts 1000 includes providing, for display within a video presentation interface of a second client device, a streamed presentation of the video proxy referencing the cloud-based location of the digital video and depicting modifications defined by the editing operation.

Moreover, in one or more embodiments the series of acts 1000 includes generating a meta video proxy layer that references the video proxy of the digital video and a plurality of additional video proxies corresponding to a plurality of additional digital videos, wherein each of the plurality of additional video proxies include corresponding editing operations to apply to a corresponding additional digital video. Further, in one or more embodiments, the series of acts 1000 includes providing, for display within the video presentation interface of the second client device, the streamed presentation of the video proxy by fetching the digital video referenced by the video proxy and applying editing operations indicated within the video proxy. Further, in one or more embodiments, the series of acts 1000 includes sending, to the second client device, a link that references the video proxy. Further, in one or more embodiments, the series of acts 1000 includes in response to receiving, from the second client device, an indication of a selection of the link, streaming the digital video modified to include the edit parameters of the editing operation without exporting the digital video.

Furthermore, in one or more embodiments the series of acts 1000 includes providing, via the video editor application of the first client device, a plurality of versions for the video proxy. Moreover, in one or more embodiments, the series of acts 1000 includes in response to receiving, from the first client device, an indication of a selection of a version of the plurality of versions, restoring the video proxy according to the selected version.

The components of the proxy-based streaming edit system 102 can include software, hardware, or both. For example, the components of the proxy-based streaming edit system 102 can include one or more instructions stored on a computer-readable storage medium and executable by processors of one or more computing devices. When executed by one or more processors, the computer-executable instructions of the proxy-based streaming edit system 102 can cause a computing device to perform the methods described herein. Alternatively, the components of the proxy-based streaming edit system 102 can comprise hardware, such as a special purpose processing device to perform a certain function or group of functions. Additionally, or alternatively, the components of the proxy-based streaming edit system 102 can include a combination of computer-executable instructions and hardware.

Furthermore, the components of the proxy-based streaming edit system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the proxy-based streaming edit system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
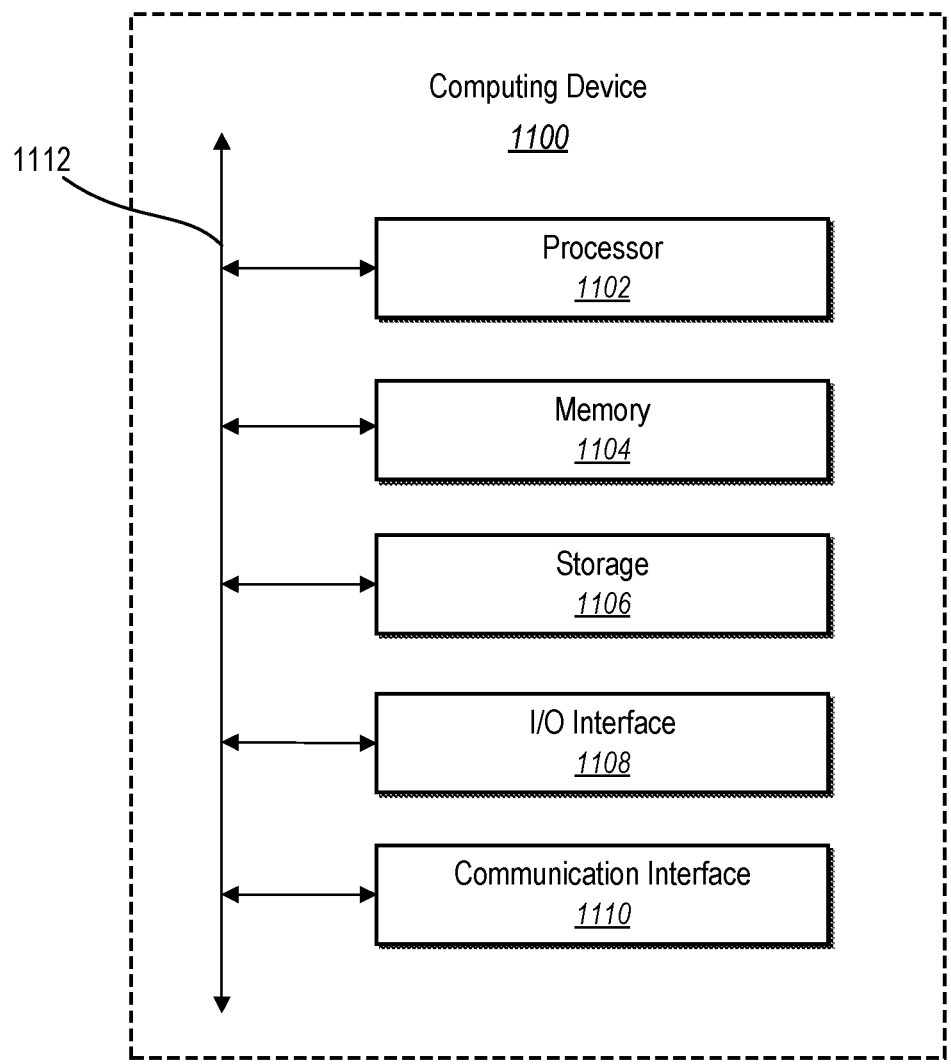
FIG. 11 illustrates a block diagram of an exemplary computing device in accordance with one or more embodiments.

FIG. 11 illustrates a block diagram of exemplary computing device 1100 (e.g., the server(s) 104 and/or the client device 108) that may be configured to perform one or more of the processes described above. One will appreciate that server(s) 104 and/or the client device 108 may comprise one or more computing devices such as computing device 1100. As shown by FIG. 11, computing device 1100 can comprise processor 1102, memory 1104, storage device 1106, I/O interface 1108, and communication interface 1110, which may be communicatively coupled by way of communication infrastructure 1112. While an exemplary computing device 1100 is shown in FIG. 11, the components illustrated in FIG. 11 are not intended to be limiting. Additional or alternative components may be used in other implementations. Furthermore, in certain implementations, computing device 1100 can include fewer components than those shown in FIG. 11. Components of computing device 1100 shown in FIG. 11 will now be described in additional detail.

In particular implementations, processor 1102 includes hardware for executing instructions, such as those making up a computer program. As an example, and not by way of limitation, to execute instructions, processor 1102 may retrieve (or fetch) the instructions from an internal register, an internal cache, memory 1104, or storage device 1106 and decode and execute them. In particular implementations, processor 1102 may include one or more internal caches for data, instructions, or addresses. As an example, and not by way of limitation, processor 1102 may include one or more instruction caches, one or more data caches, and one or more translation lookaside buffers (TLBs). Instructions in the instruction caches may be copies of instructions in memory 1104 or storage device 1106.

Memory 1104 may be used for storing data, metadata, and programs for execution by the processor(s). Memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1104 may be internal or distributed memory.

Storage device 1106 includes storage for storing data or instructions. As an example, and not by way of limitation, storage device 1106 can comprise a non-transitory storage medium described above. Storage device 1106 may include a hard disk drive (HDD), a floppy disk drive, flash memory, an optical disc, a magneto-optical disc, magnetic tape, or a Universal Serial Bus (USB) drive or a combination of two or more of these. Storage device 1106 may include removable or non-removable (or fixed) media, where appropriate. Storage device 1106 may be internal or external to computing device 1100. In particular implementations, storage device 1106 is non-volatile, solid-state memory. In other implementations, Storage device 1106 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1108 allows a user to provide input to receive output from, and otherwise transfer data to and receive data from computing device 1100. I/O interface 1108 may include a mouse, a keypad or a keyboard, a touch screen, a camera, an optical scanner, network interface, modem, other known I/O devices or a combination of such I/O interfaces. I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1108 is configured to provide graphical data to a display for presentation to a user. The graphical data may be representative of one or more graphical user interfaces and/or any other graphical content as may serve a particular implementation.

Communication interface 1110 can include hardware, software, or both. In any event, communication interface 1110 can provide one or more interfaces for communication (such as, for example, packet-based communication) between computing device 1100 and one or more other computing devices or networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1110 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1110 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1110 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1112 may include hardware, software, or both that couples components of computing device 1100 to each other. As an example and not by way of limitation, communication infrastructure 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 12:
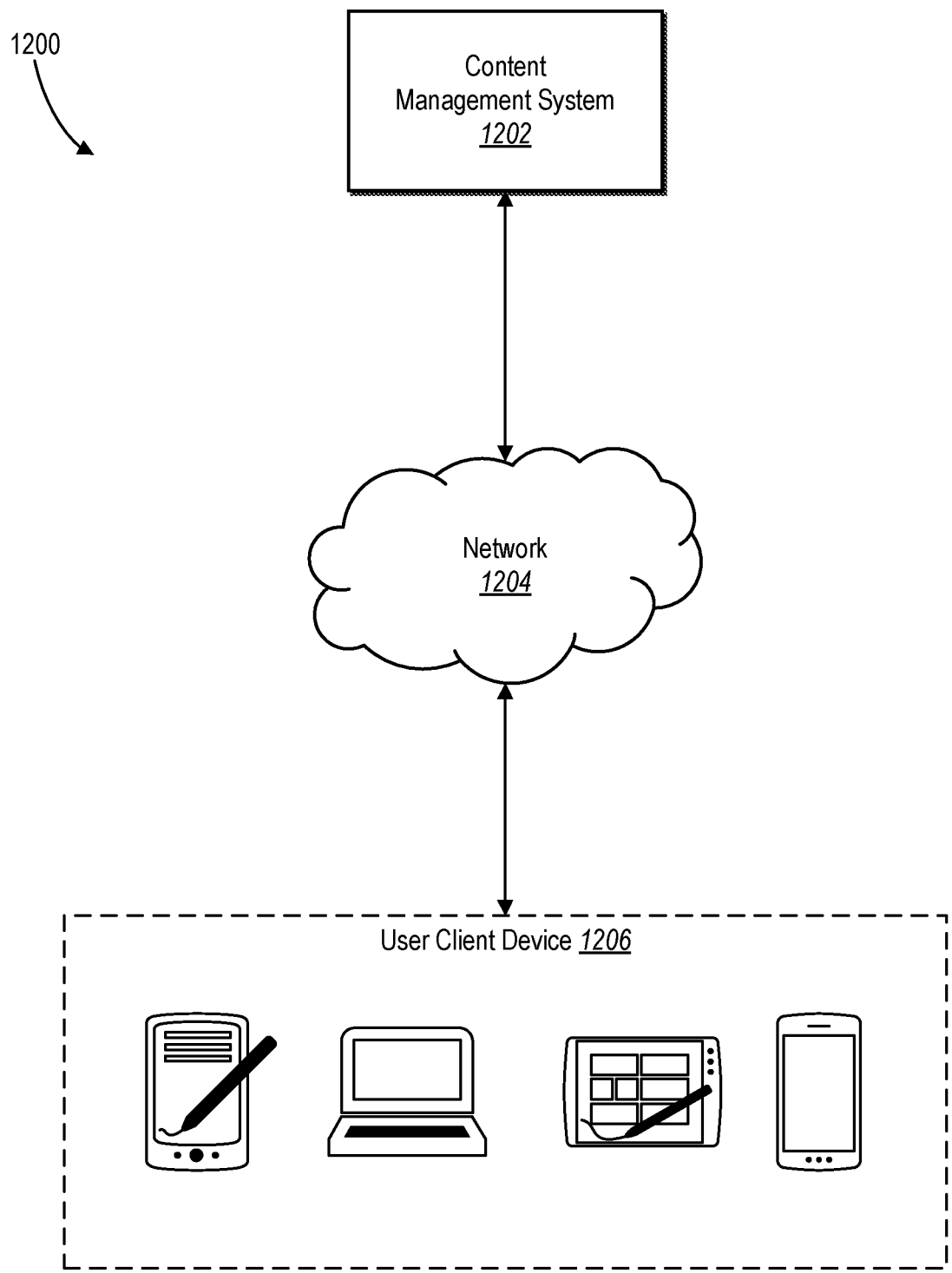
FIG. 12 illustrates an example environment of a networking system having the proxy-based streaming edit system in accordance with one or more embodiments.

FIG. 12 is a schematic diagram illustrating environment 1200 within which one or more implementations of the proxy-based streaming edit system 102 can be implemented. For example, the proxy-based streaming edit system 102 may be part of a content management system 1202 (e.g., the content management system 106). Content management system 1202 may generate, store, manage, receive, and send digital content (such as digital content items). For example, content management system 1202 may send and receive digital content to and from client device of client devices 1206 by way of network 1204. In particular, content management system 1202 can store and manage a collection of digital content. Content management system 1202 can manage the sharing of digital content between computing devices associated with a plurality of users. For instance, content management system 1202 can facilitate a user sharing a digital content with another user of content management system 1202.

In particular, content management system 1202 can manage synchronizing digital content across multiple client devices 1206 associated with one or more users. For example, a user may edit digital content using a client device of the client device 1206. The content management system 1202 can cause client device of the client devices 1206 to send the edited digital content to content management system 1202. Content management system 1202 then synchronizes the edited digital content on one or more additional computing devices.

In addition to synchronizing digital content across multiple devices, one or more implementations of content management system 1202 can provide an efficient storage option for users that have large collections of digital content. For example, content management system 1202 can store a collection of digital content on content management system 1202, while the client device of the client devices 1206 only stores reduced-sized versions of the digital content. A user can navigate and browse the reduced-sized versions (e.g., a thumbnail of a digital image) of the digital content on client device of the client devices 1206. In particular, one way in which a user can experience digital content is to browse the reduced-sized versions of the digital content on client device of client devices 1206.

Another way in which a user can experience digital content is to select a reduced-size version of digital content to request the full- or high-resolution version of digital content from content management system 1202. In particular, upon a user selecting a reduced-sized version of digital content, client device of client devices 1406 sends a request to content management system 1202 requesting the digital content associated with the reduced-sized version of the digital content. Content management system 1202 can respond to the request by sending the digital content to client device of client devices 1206. Client device of client devices 1206, upon receiving the digital content, can then present the digital content to the user. In this way, a user can have access to large collections of digital content while minimizing the amount of resources used on client device of client devices 1206.

client device of client devices 1206 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. client device of client devices 1206 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1204.

Network 1204 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client device of client devices 1206 may access content management system 1202.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed:

1. A computer-implemented method comprising:
receiving, via a video editor application, a request to edit a digital video stored in a cloud-based location of a content management system;
generating, in response to the request, a video proxy comprising a reference to the cloud-based location of the digital video;
in response to receiving an editing operation within the video editor application, modifying the video proxy to include computer instructions defining edit parameters of the editing operation;
providing, for display within an interface of the video editor application, a streamed presentation of the video proxy referencing the cloud-based location of the digital video and depicting modifications defined by the editing operation;
sending, to a client device, a link that references the video proxy; and
in response to receiving, from the client device, an indication of a selection of the link, streaming the digital video modified to include the edit parameters of the editing operation without exporting the digital video.

2. The computer-implemented method of claim 1, wherein receiving the request to edit the digital video further comprises receiving a selection of the digital video to stitch an additional digital video to the digital video.

3. The computer-implemented method of claim 1, wherein:
the editing operation comprises an indication to stitch an additional digital video to the digital video; and
modifying the video proxy comprises defining the edit parameters to reference the additional digital video.

4. The computer-implemented method of claim 1, wherein:
receiving the editing operation comprises receiving at least one modification indication to modify a color, a transition, a filter, or a framing within the digital video; and
modifying the video proxy comprises defining the edit parameters to reference the at least one modification indication.

5. The computer-implemented method of claim 1, wherein modifying the video proxy to include computer instructions defining the edit parameters comprises referencing an additional video proxy that further comprises additional computer instructions defining additional edit parameters for an additional digital video.

6. The computer-implemented method of claim 1, further comprising generating a meta video proxy layer that references the video proxy of the digital video and a plurality of additional video proxies corresponding to a plurality of additional digital videos, wherein each of the plurality of additional video proxies include corresponding editing operations to apply to a corresponding additional digital video.

7. The computer-implemented method of claim 1, wherein:
wherein the video proxy is a meta video proxy layer; and
providing the streamed presentation of the meta video proxy layer further comprises:
referencing a video proxy set to provide the streamed presentation of the meta video proxy layer by:
fetching digital videos referenced by the video proxy set; and
applying editing operations indicated within the each of the video proxies within the video proxy set to the digital videos referenced by the video proxy set.

8. The computer-implemented method of claim 1, further comprising:

receiving, from the client device, a comment for the digital video modified to include the edit parameters of the editing operation, wherein the comment indicates one or more additional modifications or edits to the digital video; and providing, for display within the interface of the video editor application, the comment from the client device along with the streamed presentation of the video proxy.

9. A system comprising:
at least one processor; and
a non-transitory computer-readable medium storing instructions which, when executed by the at least one processor, cause the system to:
receive, via a video editor application, a request to edit a plurality of digital videos stored in cloud-based locations of a content management system;
generate, in response to the request, a video proxy comprising a reference to the cloud-based locations of the plurality of digital videos;
in response to receiving an editing operation within the video editor application, modify the video proxy to include computer instructions defining edit parameters of the editing operation;
provide for display within an interface of the video editor application, a streamed presentation of the video proxy referencing the cloud-based locations of the plurality of digital videos and depicting modifications defined by the editing operation;
send, to a client device, a link that references the video proxy; and
in response to receiving, from the client device, an indication of a selection of the link, stream the plurality of digital videos modified to include the edit parameters of the editing operation without exporting the plurality of digital videos.

10. The system of claim 9, further storing instructions which, when executed by the at least one processor, cause the system to receive the request to edit the plurality of digital videos further comprises a selection of a digital video template to modify by including the plurality of digital videos.

11. The system of claim 9, further storing instructions which, when executed by the at least one processor, cause the system to modify the video proxy to include the computer instructions defining the edit parameters of a reference to transition from a first digital video of the plurality of digital videos to a second digital video of the plurality of digital videos.

12. The system of claim 9, wherein:
receiving the editing operation comprises receiving a first modification indication to modify a first digital video of the plurality of digital videos and a second modification indication to modify a second digital video of the plurality of digital videos; and
modifying the video proxy comprises defining the edit parameters to reference the first modification indication and the second modification indication.

13. The system of claim 9, further storing instructions which, when executed by the at least one processor, cause the system to reference an additional video proxy that further comprises additional computer instructions defining additional edit parameters for an additional plurality of digital videos.

14. The system of claim 9, further storing instructions which, when executed by the at least one processor, cause the system to:

receive an indication to export the streamed presentation according to the video proxy;
generate, at the content management system, an exported digital video of the streamed presentation by applying the computer instructions defining the edit parameters of the editing operation from the video proxy; and
store the exported digital video in an additional cloud-based location of the content management system.

15. The system of claim 9, further storing instructions which, when executed by the at least one processor, cause the system to:
store the video proxy in an additional cloud-based location of the content management system; and
in response to an indication to edit the plurality of digital videos either post-export or pre-export, provide the video proxy to the client device.

16. A non-transitory computer-readable medium storing executable instructions which, when executed by at least one processor, cause the at least one processor to:
receive, via a video editor application of a first client device, a request to edit a digital video stored in a cloud-based location of a content management system;
generate, in response to the request, a video proxy comprising a reference to the cloud-based location of the digital video;
in response to an editing operation within the video editor application of the first client device, modify the video proxy to include computer instructions defining edit parameters of the editing operation;
send, to a second client device, a link that references the video proxy; and
in response to receiving, from the second client device, an indication of a selection of the link, stream, within a video presentation interface of the second client device, the digital video modified to include the edit parameters of the editing operation without exporting the digital video.

17. The non-transitory computer-readable medium of claim 16, further storing instructions which, when executed by the at least one processor, cause the at least one processor to generate a meta video proxy layer that references the video proxy of the digital video and a plurality of additional video proxies corresponding to a plurality of additional digital videos, wherein each of the plurality of additional video proxies include corresponding editing operations to apply to a corresponding additional digital video.

18. The non-transitory computer-readable medium of claim 16, further storing instructions which, when executed by the at least one processor, cause the at least one processor to stream, within the video presentation interface of the second client device, the streamed presentation of the video proxy by fetching the digital video referenced by the video proxy and applying editing operations indicated within the video proxy.

19. The non-transitory computer-readable medium of claim 16, further storing instructions which, when executed by the at least one processor, cause the at least one processor to:
receive, from the second client device, a comment for the digital video modified to include the edit parameters of the editing operation, wherein the comment indicates one or more additional modifications or edits to the digital video; and
provide, for display within the video editor application of the first client device, the comment from the second client device along with a streamed presentation of the video proxy.

20. The non-transitory computer-readable medium of claim 16, further storing instructions which, when executed by the at least one processor, cause the at least one processor to:
- provide, via the video editor application of the first client device, a plurality of versions for the video proxy; and
- in response to receiving, from the first client device, an indication of a selection of a version of the plurality of versions, restore the video proxy according to the selected version.

* * * * *